United States Patent
Mizuno et al.

(10) Patent No.: US 10,601,123 B2
(45) Date of Patent: Mar. 24, 2020

(54) VEHICULAR ANTENNA DEVICE

(71) Applicant: YOKOWO CO., LTD., Kita-ku, Tokyo (JP)

(72) Inventors: Hirotoshi Mizuno, Tomioka (JP); Masayuki Goto, Tomioka (JP); Yusuke Yokota, Tomioka (JP)

(73) Assignee: YOKOWO CO., LTD., Kita-ku, Tokyo (JP)

( * ) Notice: Subject to any disclaimer, the term of this patent is extended or adjusted under 35 U.S.C. 154(b) by 98 days.

(21) Appl. No.: 15/759,641

(22) PCT Filed: Dec. 18, 2015

(86) PCT No.: PCT/JP2015/085550
§ 371 (c)(1),
(2) Date: Mar. 13, 2018

(87) PCT Pub. No.: WO2017/046972
PCT Pub. Date: Mar. 23, 2017

(65) Prior Publication Data
US 2018/0261912 A1    Sep. 13, 2018

Related U.S. Application Data

(60) Provisional application No. 62/218,261, filed on Sep. 14, 2015.

(51) Int. Cl.
*H01Q 1/32* (2006.01)
*H01Q 1/48* (2006.01)
(Continued)

(52) U.S. Cl.
CPC .............. *H01Q 1/32* (2013.01); *H01Q 1/3275* (2013.01); *H01Q 1/526* (2013.01);
(Continued)

(58) Field of Classification Search
CPC ........ H01Q 1/32; H01Q 1/3275; H01Q 1/526; H01Q 9/30; H01Q 1/48; H04N 5/22521;
(Continued)

(56) References Cited

U.S. PATENT DOCUMENTS 5,959,585 A     9/1999  Militz
6,870,509 B2 *  3/2005  Ooe ..................... H01Q 1/1271
                                                     343/711

(Continued)

FOREIGN PATENT DOCUMENTS

DE      195 43 625 C1    1/1997
JP      2004-304461 A    10/2004
(Continued)

OTHER PUBLICATIONS

International Search Report dated Feb. 23, 2016, for corresponding International Patent Application No. PCT/JP2015/085550.
(Continued)

*Primary Examiner* — Hai V Tran
(74) *Attorney, Agent, or Firm* — Morgan, Lewis & Bockius LLP

(57) ABSTRACT

A vehicular antenna device capable of preventing reception trouble in a radio, a TV receiver, or the like due to noise by suppressing electromagnetic noise radiated from an electronic device or the like is provided. A vehicular antenna device is equipped with an antenna base 2 which is fixed to a vehicle body via an attaching member, an antenna case which covers the antenna base, and an antenna element 5 and a camera module 10 as an electronic device which are disposed in an internal space surrounded by the antenna base 2 and the antenna case. A camera module case 40 surrounds a circuit board 50 of the camera module 10 and thereby shields it.

25 Claims, 18 Drawing Sheets

(51) Int. Cl.
*H04N 5/225* (2006.01)
*H01Q 1/52* (2006.01)
*H05H 5/00* (2006.01)
*H01Q 9/30* (2006.01)

(52) U.S. Cl.
CPC ....... *H04N 5/2257* (2013.01); *H04N 5/22521* (2018.08); *H01Q 1/48* (2013.01); *H01Q 9/30* (2013.01); *H04N 5/2253* (2013.01); *H04N 5/2254* (2013.01); *H05H 5/00* (2013.01)

(58) Field of Classification Search
CPC .. H04N 5/2257; H04N 5/2252; H04N 5/2253; H04N 5/2254; H05H 5/00
USPC ......................................................... 343/720
See application file for complete search history.

(56) References Cited

U.S. PATENT DOCUMENTS

| | | |
|---|---|---|
| 2007/0171138 A1 | 7/2007 | Noro |
| 2007/0182649 A1 | 8/2007 | Kondou |
| 2012/0274519 A1* | 11/2012 | Chakam ............... H01Q 1/3275 343/702 |
| 2014/0248846 A1* | 9/2014 | Yanagisawa ............ H03F 3/193 455/234.1 |
| 2014/0292593 A1 | 10/2014 | Thiam et al. |
| 2015/0307026 A1* | 10/2015 | Minikey, Jr. ............ B60R 11/04 348/148 |
| 2017/0033449 A1* | 2/2017 | Talty .................... H01Q 1/3275 |
| 2017/0179584 A1* | 6/2017 | Nakada ................ H01Q 1/3275 |
| 2019/0036198 A1* | 1/2019 | Mizuno .................... H01Q 1/22 |

FOREIGN PATENT DOCUMENTS

| | | |
|---|---|---|
| JP | 2005-193733 A | 7/2005 |
| JP | 2007-208171 A | 8/2007 |
| JP | 2008-085386 A | 4/2008 |
| JP | 2014-150496 A | 8/2014 |

OTHER PUBLICATIONS

Written Opinion of the International Searching Authority dated Feb. 23, 2016, for corresponding International Patent Application No. PCT/JP2015/085550.

* cited by examiner

1: VEHICULAR ANTENNA DEVICE

VEHICULAR ANTENNA DEVICE

TECHNICAL FIELD

The present invention relates to a vehicular antenna device incorporating an electronic device that acts as a noise generation source.

BACKGROUND ART

Conventionally, a vehicular electronic device is installed in a vehicle compartment and electromagnetic noise radiated from the electronic device is interrupted by a vehicle body serving as a shield and hence does not affect an antenna adversely that is attached on a roof of the vehicle body.

In recent years, techniques for sensing a vehicle surrounding situation becomes considered as important, as techniques used for autonomous driving, drive assistance or the like, and it is increased to mount electronic devices for sensing outside a vehicle compartment. This is associated with a drawback that when an electronic device (e.g., camera) is installed near the vehicle antenna, electromagnetic noise radiated from the electronic device etc. is received by an antenna to cause reception trouble in a radio, a TV receiver, etc.

A specific vehicular antenna device incorporating a camera module as an electronic device will be described using FIGS. 20 and 21. A vehicular antenna device 100 shown in FIG. 20 is equipped with an antenna element 103, an antenna amplifier board 104, and a camera module 110 which are disposed in a space surrounded by an antenna base 101 and an antenna case 102. The camera module 110, which serves to take a moving image and/or a still image of, for example, a scene behind the vehicle body, has a configuration shown in FIG. 21. That is, the camera module 110 is equipped with a lens 111, an image sensor unit 112, a video signal output unit 113, an oscillator 114, and a power unit 115 for supplying electric power to the individual circuit units in such a manner that they are disposed in a camera module case 120. A module cable 121 (including a signal line and a power line) which is connected to the camera module 110 passes through an attachment hole of a vehicle body roof R to which the vehicular antenna device 100 is attached and is connected to connection targets 125 such as a battery, a monitor, and an operating panel. An antenna cable 105 which is connected to the antenna amplifier board 104 also leads to inside the vehicle compartment through the attachment hole of the vehicle body roof R.

The principle according to which noise is generated in this case will be described. When the camera module 110 is powered on, a voltage +12 V supplied from the vehicle needs to be converted into voltages (e.g., +3.3 V) to be used inside the module. Noise is generated by a switching regulator of the power unit 115 in the process of this voltage conversion. Noise is also generated by the oscillator 114 which is provided inside the module and allows the image sensor unit 112 to operate. That is, the power unit 115 and the oscillator 114 also act as noise sources and noise propagates through lines that connect them to the other circuit units. Resulting noise is radiated to the outside passing through the case 120. Furthermore, noise is radiated from the module cable 121 which includes the signal line and the power line. That is, there are two general noise radiation (transmission) paths: one is a path of radiation from a circuit board (mounted with the image sensor unit 112 to the power unit 115) of the camera module and the other is a path along which noise is radiated as it propagates through the power line, the signal line, etc. of the module cable 121.

In the vehicular antenna device 100 shown in FIG. 20 in which a condition is established that the antenna element 103 and the camera module 110 as an electronic device are close to each other, noise that is radiated from the circuit board of the camera module 110 is received by the antenna element 103 to interfere with an audio signal and an image signal of a radio, a TV receiver, or the like that should be received properly. Likewise, noise that is radiated from the power line, the signal line, etc. which are connected to the camera module 110 is received by the antenna element 103 to interfere with a signal that should be received properly.

The following Patent documents 1 and 2 are known as describing a vehicular camera device.

PRIOR ART DOCUMENTS

Patent Documents

Patent document 1: JP-A-2014-150496
Patent document 2: JP-A-2007-208171

Patent document 1 discloses a device in which an antenna device incorporates a camera, but no countermeasure is taken against noise. Although the device disclosed Patent document 2 has a structure for suppressing electromagnetic noise generated by a camera, it is presumed that an antenna is disposed separately from the camera at a position apart from the camera.

SUMMARY OF THE INVENTION

Problems to be Solved by the Invention

The present invention has been made in view of the above circumstances, and an object of the present invention is therefore to provide an electronic-device-incorporated vehicular antenna device capable of preventing reception trouble in a radio, a TV receiver, or the like due to noise by suppressing electromagnetic noise radiated from an electronic device.

Means for Solving the Problems

An aspect of the present invention is a vehicular antenna device. The vehicular antenna device has:
an antenna base which is fixed to a vehicle body via an attaching member;
an antenna case which covers the antenna base; and
an antenna element and an electronic device which are disposed in an internal space surrounded by the antenna base and the antenna case, and
a shield conductor is disposed so as to surround at least a part of a noise generation source existing in the electronic device.

The electronic device may have a case which surrounds the noise generation source; the case may be the shield conductor or be such that the shield conductor is provided on at least one of an inside and an outside an insulative body; and the shield conductor may be grounded to the vehicle body.

The shield conductor may be provided so as to cover one surface or both surfaces of a circuit board of the electronic device.

The antenna base may have an attachment conductive member; and the shield conductor may be grounded to the vehicle body via the attachment conductive member.

The antenna base may have an attachment conductive member and a conductor baseplate; the case may be disposed on the baseplate; and the shield conductor that is the case or is included in the case may be electrically connected to the baseplate.

The baseplate and the case may be integrally formed of a conductive body.

The antenna base may have an attachment conductive member and an insulative baseplate; the case may be disposed on the insulative baseplate; and the shield conductor that is the case or in included in the case may be electrically connected to the attachment conductive member via a first connecting member.

A shielded cable may be connected to the electronic device; and a shield sheath conductor of the shielded cable may be grounded to the vehicle body.

The shield conductor may be grounded to the vehicle body via the shield sheath conductor.

One end portion of a second connecting member may be connected to the shield sheath conductor; and the other end portion may be held by the attaching member and thereby grounded to the vehicle body.

The electronic device may include a noise filter for reduction of noise generated by the noise generation source.

The noise filter may eliminate noise in a reception band of a signal that is received via the antenna element.

The electronic device may be a camera module; and a window that corresponds to a lens of the camera module may be formed in the antenna case.

The camera module may be attached in such a manner that an inclination angle of the camera module is adjustable with respect to the antenna base.

Any combination of the above constituent elements and an expression of the present invention as converted between a method, a system, etc. are also effective aspects of the present invention.

Advantages of the Invention

Since the shield conductor is disposed so as to surround at least a part of the noise generation source existing in the electronic device, the vehicular antenna device according to the present invention can suppress electromagnetic noise radiated from the electronic device and thereby prevent reception trouble in a radio, a TV receiver, or the like due to noise.

MODES FOR CARRYING OUT THE INVENTION

Figure 1A:
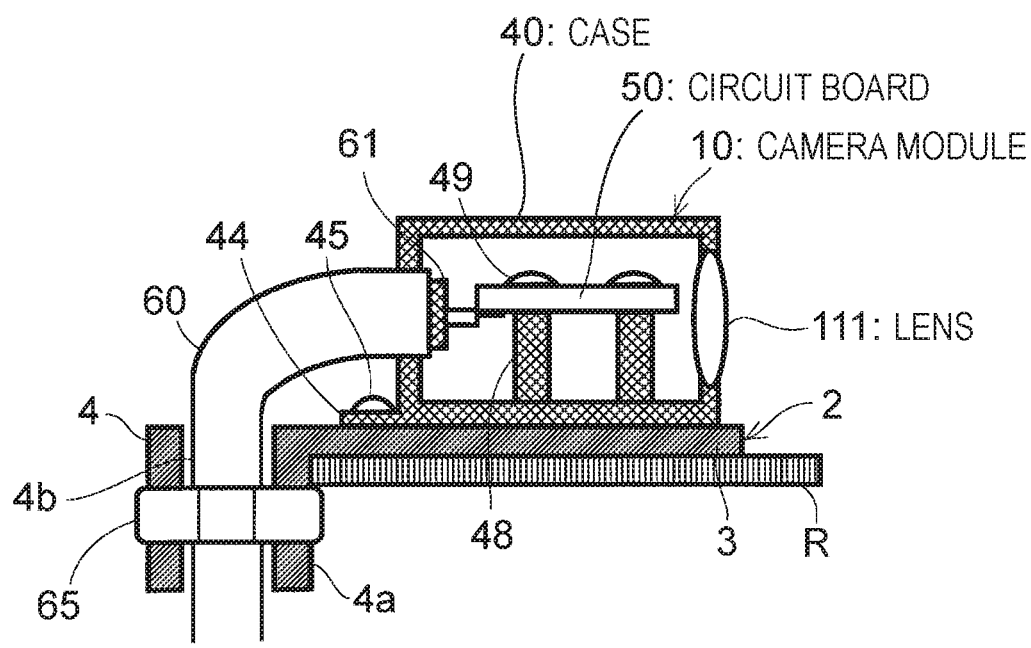
FIG. 1A is a schematic side sectional view showing the configuration of an essential part of a vehicular antenna device according to a first embodiment of the present invention.

Preferred embodiments of the present invention will be hereinafter described in detail with reference to the drawings. The same or equivalent constituent elements, members, steps, or the like shown in the drawings will be given the same symbols and redundant descriptions therefor will be omitted as appropriate. The embodiments are examples and are not intended to restrict the invention, and all features described in the embodiments and combinations thereof are not necessarily essential ones of the invention.

FIGS. 1A, 2A, 3A, and 4 show the configurations of essential parts of vehicular antenna devices according to first, second, third, and fourth embodiments of the present invention, respectively. In each of the vehicular antenna devices, an antenna base 2 has a metal baseplate 3 and an attachment conductive member (pre-locking member) 4 which are made of a metal (conductor) and the attachment conductive member 4 is provided with an attaching member for attachment to a vehicle body roof R. FIGS. 5-10 show the overall configuration of a vehicular antenna device to which the first to fourth embodiments are applied.

First, the overall configuration of the vehicular antenna device to which the first to fourth embodiments are applied will be described using FIGS. 5-10. As shown in these figures, the vehicular antenna device 1 is equipped with the antenna base 2 having the baseplate 3 and the attachment conductive member (pre-locking member) 4, an antenna element 5 having a coil 6 and a top element 7, an antenna amplifier board 8 for amplifying a reception signal of the antenna element 5, an inner case 9 which houses the antenna element 5 and the antenna amplifier board 8 inside, a camera module 10 (electronic device) which is attached to the back wall (i.e., the wall that faces the rear side of the vehicle body) of the inner case 9, and an outer case 11 (outside antenna case) which covers the inner case 9 and the camera module 10. The camera module 10 serves to take a moving image and/or a still image of, for example, a scene behind the vehicle body. The inner case 9 and the outer case 11 are made of a synthetic resin and hence transmit electromagnetic waves. For example, the outer case 11 has a shark fin shape (streamline shape) that becomes narrower as the position goes toward its tip.

The coil 6 of the antenna element 5 may be replaced by another wavelength shortening element.

The antenna base 2 is a combination of the metal baseplate 3 and the attachment conductive member (pre-locking member) 4. The baseplate 3 has a hole 3a for leading of an antenna cable 12 which is connected to the antenna amplifier board 8 and a module cable 60 which is connected to the camera module 10, and an attachment nut 15 is fixed to and integrated with the baseplate 3 so as to be exposed from a part of the hole 3a. The attachment nut 15 is an antenna base side attaching member for attaching the vehicular antenna device 1 to the vehicle body roof R.

The attachment conductive member 4 of the antenna base 2 is attached to and integrated with the baseplate 3, and its bottom surface is formed with a projection 4a which is to penetrate through an attachment hole of the vehicle body roof R. The attachment conductive member 4 has a hole 4b for leading of an antenna cable 12 and a module cable 60 and a through-hole through which to insert a conductor (metal) bolt 16 for fastening a conductor (metal) washer 17 having nails. The bolt 16 and the washer 17 having nails constitute an attaching member together with the attachment nut 15. Before attachment of the antenna device 1, the bolt 16 penetrates through the attachment conductive member 4 and is threadedly engaged with the attachment nut 15 loosely. A ring-shaped antenna attachment pad 18 (waterproof sealing member) is disposed on the side of the bottom surface of the antenna base 2 so as to surround a bottom portion of the attachment conductive member 4 (necessarily surround the attachment hole of the vehicle body roof R).

Figure 6:
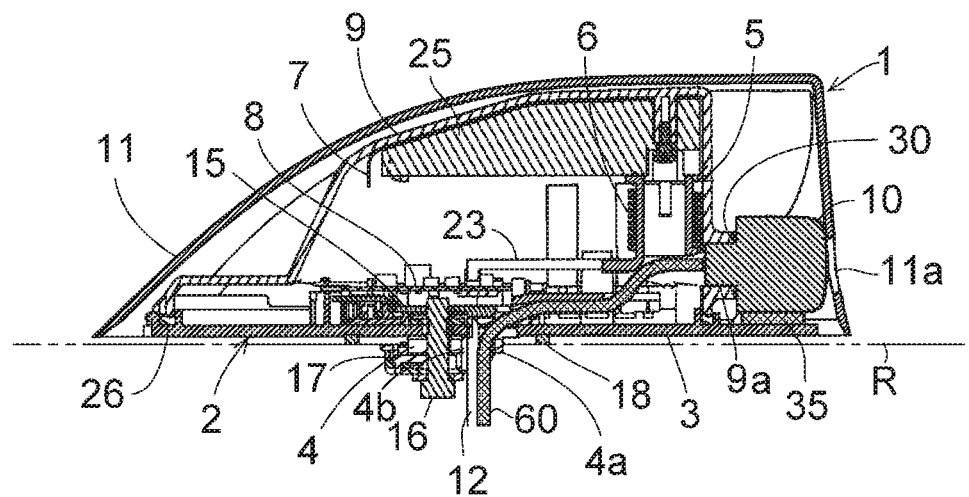
FIG. 6 is a side sectional view of the vehicular antenna devices to which the first to fourth embodiments are applied.
Figure 7:
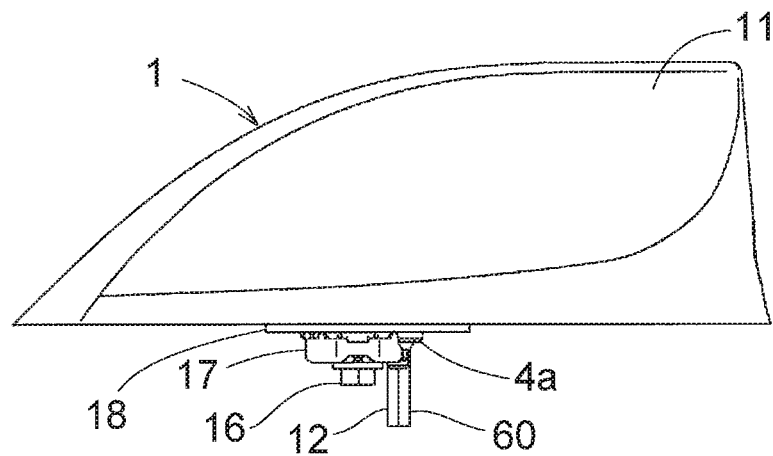
FIG. 7 is a side view of the same vehicular antenna device.

Subsequently, the bottom portion of the attachment conductive member (pre-locking member) 4 is fitted into the attachment hole of the vehicle body roof R shown in FIG. 6 from above the roof and the washer 17 having nails is attached to the bolt 16 from inside the vehicle body roof R to fix the attachment conductive member 4 tentatively. Then, as shown in FIG. 6, in a state that the antenna attachment pad 18 is set between the antenna base 2 and the outer surface of the vehicle body roof R, the bolt 16 is threadedly engaged with the attachment nut 15 (located on the side of the antenna base 2) and fastened to the nut 15 by rotating the bolt 16 with respect to the nut 15. In this manner, the antenna device 1 can be attached to the vehicle body roof R. The metal baseplate 3 and the attachment conductive member 4 of the antenna base 2 are grounded to the vehicle body along a route including the conductor bolt 16 and the washer 17 having nails (the nails bite into the metal surface of the vehicle body roof R).

The antenna amplifier board 8 incorporates, among other things, an amplifier for amplifying a reception signal of the antenna element 5 and is disposed on the antenna base 2. A ground conductor pattern (ground pattern) formed on the antenna amplifier board 8 is electrically connected to a metal portion of the baseplate 3 or the attachment conductive member 4. For example, the ground conductor pattern is soldered directly to a projection that projects from the top surface of the baseplate 3.

A cable holder 20 which is an insulative body (synthetic resin mold) is laid on and fixed to the bottom surface of the antenna amplifier board 8. A portion, on the side of connection to the antenna amplifier board 8, of the antenna cable 12 is housed in the cable holder 20. A cable cover 21 is fixed to the cable holder 20 so as to cover the cable holder 20 from above. An extending portion of the antenna cable 12 leads to the outside (i.e., the side of the bottom surface of the antenna base 2) through the hole 3a of the baseplate 3 and the hole 4b of the attachment conductive member 4.

The antenna element 5 is such as to be able to receive AM radio broadcast, FM radio broadcast, etc. The coil 6 of the antenna element 5 is fixed to a top element holder 25 by a coil fixing screw 22. The bottom end of the coil 6 is electrically connected to the antenna amplifier board 8 via a connecting conductor 23, and the top end of the coil 6 is electrically connected to the top element 7 via a connecting conductor 24. The top element 7, which serves as a capacitor element, is supported by the top element holder 25 which is an insulative body (synthetic resin mold) and is fixed to a top portion of the coil 6.

The inner case 9 is fixed to the baseplate 3 by fixing screws 27 in a state that an inner case pad 26 (waterproof sealing member) is sandwiched between itself and the top surface of the baseplate 3. The antenna element 5 and the antenna amplifier board 8 are set in a waterproof space that is surrounded by the antenna base 2 and the inner case 9.

As shown in FIG. 6, the camera module 10 is attached to the baseplate 3 by fixing screws 31 in such a manner as to be fitted watertightly into a camera attachment hole 9a which is formed in a rear wall of the inner case 9 via an O-ring 30 which is a watertight sealing member. A vibration-absorbing gasket (elastic member) 35 is sandwiched between the baseplate 3 and the camera module 10. The module cable 60 which is connected to the camera module 10 is a data cable for taking out an image signal taken to the outside. The module cable 60 leads into the inner case 9 and then to the outside (i.e., the side of the bottom surface of the antenna base 2) through the hole 3a of the baseplate 3 and the hole 4b of the attachment conductive member 4.

Figure 8:
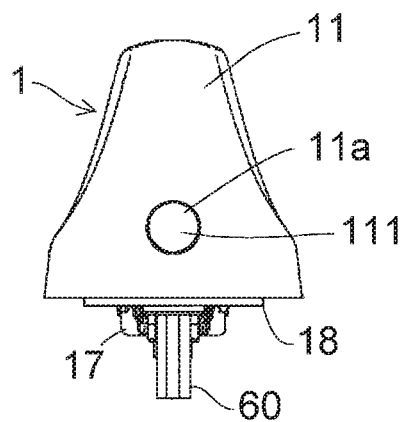
FIG. 8 is a rear view of the same vehicular antenna device.
Figure 9:
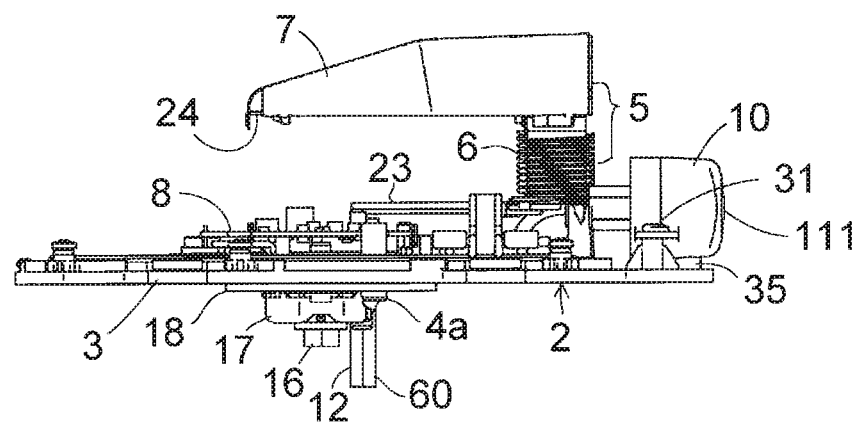
FIG. 9 is a side view of the vehicular antenna device to which the first to fourth embodiments are applied in which an inner case and an outer case are omitted.
Figure 10:
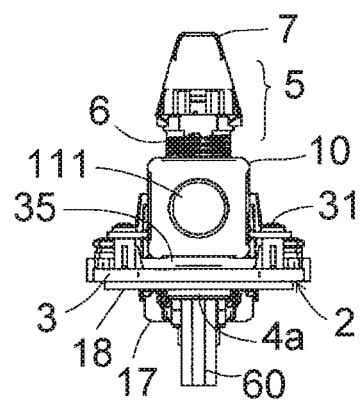
FIG. 10 is a rear view of the same vehicular antenna device.

The outer case 11 is fixed to the antenna base 2 from above so as to cover the inner case 9 and the camera module 10. Thus, the camera module 10 is set in the internal space that is surrounded by the antenna base 2 and the outer case 11. As shown in FIGS. 6 and 8, a window 11a is formed in a rear wall of the outer case 11 so as to correspond in position to a lens 111 of the camera module 10. As for the structure of the window 11a, it may be either left as a through-hole or closed by a transparent member.

The sectional view of FIG. 6 shows an example structure of the attaching member for attaching the vehicular antenna device 1 to the vehicle body roof R in which the antenna base 2 is fixed to the vehicle body roof R using the bolt 16 and the specially shaped washer 17 having nails as attachment metal fittings, that is, by attaching, from inside the vehicle body roof R, the washer 17 having nails to the bolt 16 being threadedly engaged with the antenna-base-side nut 15. Alternatively, it is possible to employ an attaching member in which the attachment conductive member 4 is formed with a male screw and a nut as an attachment metal fitting is threadedly engaged with the male screw from inside the vehicle body roof R.

Embodiment 1

Figure 17:
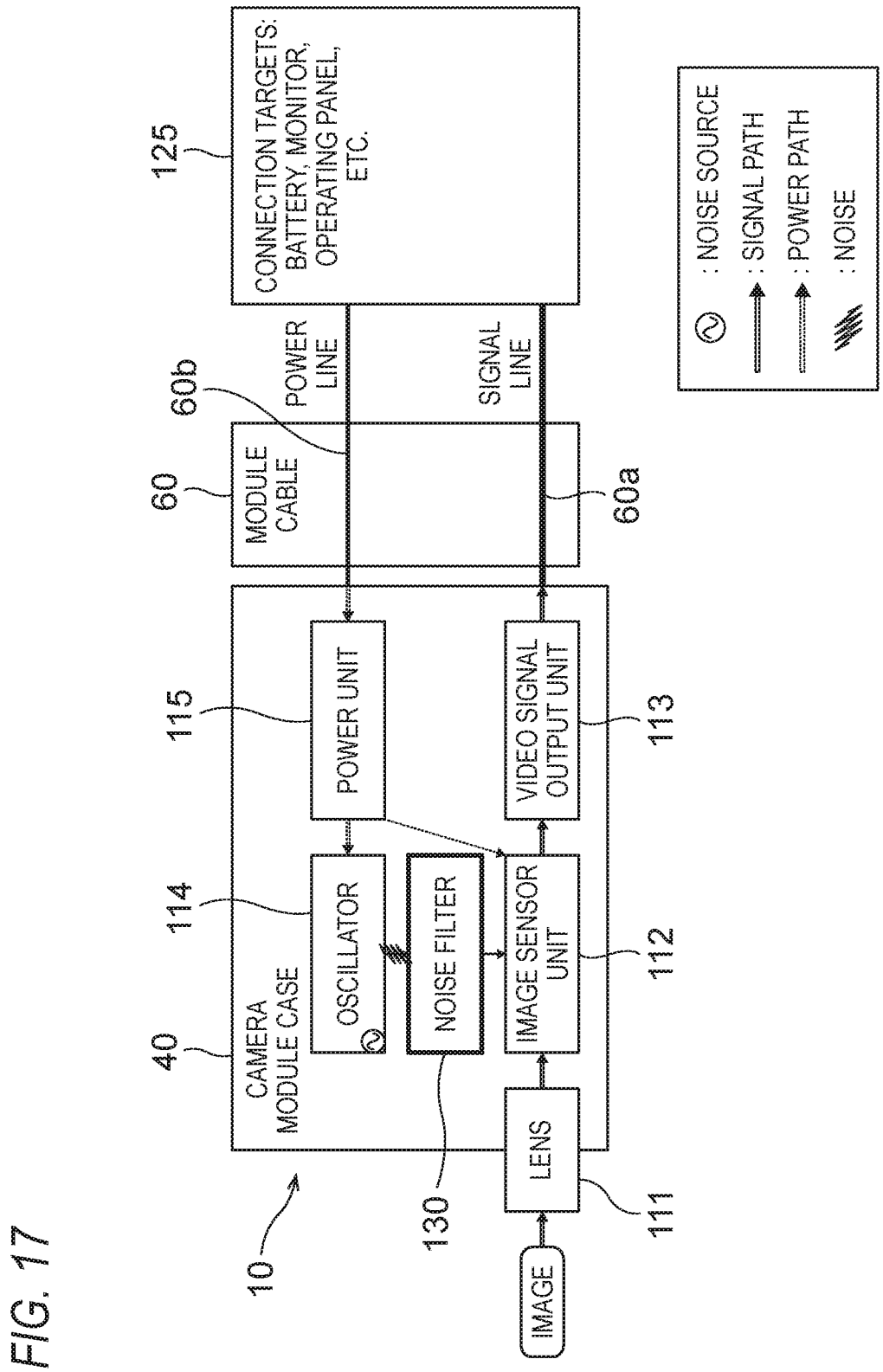
FIG. 17 is a block diagram showing the circuit configuration of the camera module in a case that the camera module is provided with a noise filter in each embodiment of the present invention.

FIG. 1A shows the configuration of an essential part of the vehicular antenna device according to the first embodiment of the present invention, and shows a noise reduction shield structure of the vehicular antenna device 1 shown in FIGS. 5-10. In this case, a camera module case 40 of the camera module 10 is a metal member (e.g., aluminum diecast member) that also serves as a shield conductor for shielding a circuit board 50 by surrounding it. The lens 111 is attached to a rear wall of the camera module case 40, and the circuit board 50 is fixed to bosses (projections) 48 which project inside the case 40 by metal board attachment screws 49. The circuit board 50 which is housed in the case 40 is mounted with an image sensor unit 112, a video signal output unit 113, an oscillator 114, a power unit 115 for supplying electric power to the circuit units, a noise filter 130, etc. which are shown in FIG. 17 (the structure, workings, and advantages of the noise filter 130 will be described later). The image sensor unit 112 serves to generate a video signal of an image taken through the lens 111 receiving an electrical signal having a predetermined frequency (e.g., 27 MHz) from the oscillator 114. The video signal output unit 113 serves to amplify the video signal and outputs the amplified video signal to a signal line 60a of the module cable 60. The module cable 60 also includes a power line 60b etc.; one end of the module cable 60 is connected to the circuit board 50 and its other end is connected to connection targets 125 such as a battery, a monitor, and an operating panel.

Figure 1B:
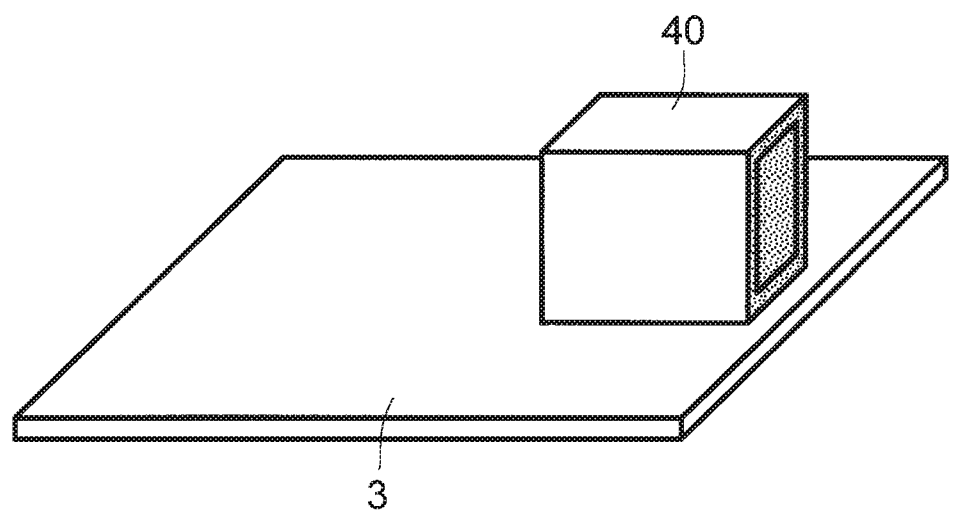
FIG. 1B is a perspective view showing a case that a case of a camera module is disposed on an antenna base in the first embodiment.

The antenna base 2 has the metal baseplate 3 which is made of a metal (conductor) and the attachment conductive member 4 which is located at a central position of the metal baseplate 3, and the case 40 of the camera module 10 is disposed on the metal baseplate 3 (in this case, the baseplate 3 and the attachment conductive member 4 may be either separate components or an integrated component). The case 40 of the camera module 10 is fixed by screwing a flange portion 44 which is integrated with the case 40 to the top surface of baseplate 3 by conductive screws 45. An example method for electrically connecting the case 40 to the metal baseplate 3 is screwing and/or soldering of the metal flange portion.

Where the metal baseplate 3 and the case 40 constitute a metal (conductor) integrated component (e.g., aluminum diecast component) as shown in FIG. 1B, advantages are provided that the waterproof structure of the antenna device can be simplified (i.e., a member for and work of filling the gap between the baseplate 3 and the case 40 can be omitted), fixing members for fixing the case 40 to the baseplate 3 can be omitted, and steps of work of fixing fixing members and work of electrically connecting the case 40 to the baseplate 3 can be omitted. Furthermore, since the height of the case 40 with respect to the antenna base 2 is reduced and the distance between the case 40 and the antenna element 5 which is located over the antenna base 2 is increased, the influence that the shielding-related conductor of the case 40 exerts on the antenna element 5 about the reception of radio broadcast can be reduced.

The attachment conductive member 4 is fixed to the vehicle body roof R by (threadedly) engaging, from the vehicle compartment side, an attachment metal fitting (nut or washer) 65 with the projection 4a which penetrates through the attachment hole of the vehicle body roof R. More specifically, where the attachment metal fitting 65 is a metal nut that is made of a metal as a conductor, the outer circumference of the projection 4a is formed with a male screw and the attachment metal fitting 65 is threadedly engaged with the male screw. Where the attachment metal fitting 65 is a washer, the washer is fastened and fixed to the attachment conductive member 4 also using a bolt as shown in the sectional view of FIG. 6. In this manner, the attachment metal fitting is electrically connected to the roof.

The circuit board 50 is fixed to the bosses 48 by the conductive board attachment screws 49. In doing so, it is possible to electrically connect a ground conductor pattern (ground pattern) of the circuit board 50 to the bosses 48 (and hence to the case 40 which is a shield conductor). A structure may be employed in which the ground conductor pattern of the circuit board 50 is not electrically connected to the case 40 directly.

The module cable 60 which is connected to the circuit board 50 which is located in the case 40 penetrates through the case 40 and leads out to the side of the bottom surface of the antenna base 2 (the outside of the antenna device) through the hole 4b which is formed inside the projection 4a of the attachment conductive member 4. The module cable 60 is a shielded cable and has a shield sheath conductor 61 which surrounds the signal line 60a, the power line 60b, etc. The shield sheath conductor 61 may be either electrically connected to the case 40 directly or electrically connected to the attachment conductive member 4 via a separate connecting member (not shown in any drawings).

The module cable 60 has a ground line (not shown in any drawings) that is connected to the ground conductor pattern (ground pattern) of the circuit board 50 inside the shield sheath conductor 61. As a general rule, an end portion, located inside the case, of the shield sheath conductor 61 is connected to the ground conductor pattern of the circuit board 50; however, it is not always the case that the end portion of the shield sheath conductor 61 is connected to a portion formed on the circuit board 50.

With the above configuration, both of the case 40 and the shield sheath conductor 61 of the module cable 60 are grounded to the vehicle body roof R and the case 40 of the camera module 10 and the module cable 60 serve for shielding, whereby noise that is radiated to the outside from the circuit board 50 is suppressed.

Figure 18:
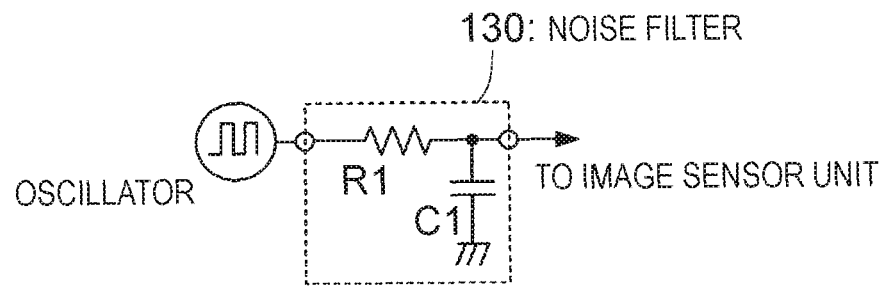
FIG. 18 is a circuit diagram of a noise filter (lowpass filter) employed in the above circuit configuration of the camera module.

Furthermore, the noise filter 130 is provided on the circuit board 50 as shown in FIG. 17. The noise filter 130, which is inserted between the output side of the oscillator 114 and the image sensor unit 112, is, for example, a lowpass filter having a resistor R1 and capacitor C1 shown in FIG. 18 and mainly serves to suppress oscillator noise. The noise filter shown in FIG. 18 is an example filter for suppressing a third harmonic wave (81 MHz that is within an FM reception band) when the frequency of the oscillator is 27 MHz.

The noise filter 130 can suppress noise in an FM band (a frequency band 76 to 108 MHz of FM radio broadcast) by eliminating noise other than frequency signals that are necessary for generation of a video signal in the image sensor unit 112. Likewise, it is possible to suppress noise in an even higher, TV broadcast frequency band.

The noise filter 130 can also suppress a phenomenon that noise generated by a switching regulator that is included in the power unit 115 enters the image sensor unit 112 via the oscillator 114. Furthermore, although not shown in any drawings, if necessary, a noise filter may be added to a power supply line for the power unit 115.

Figure 22:
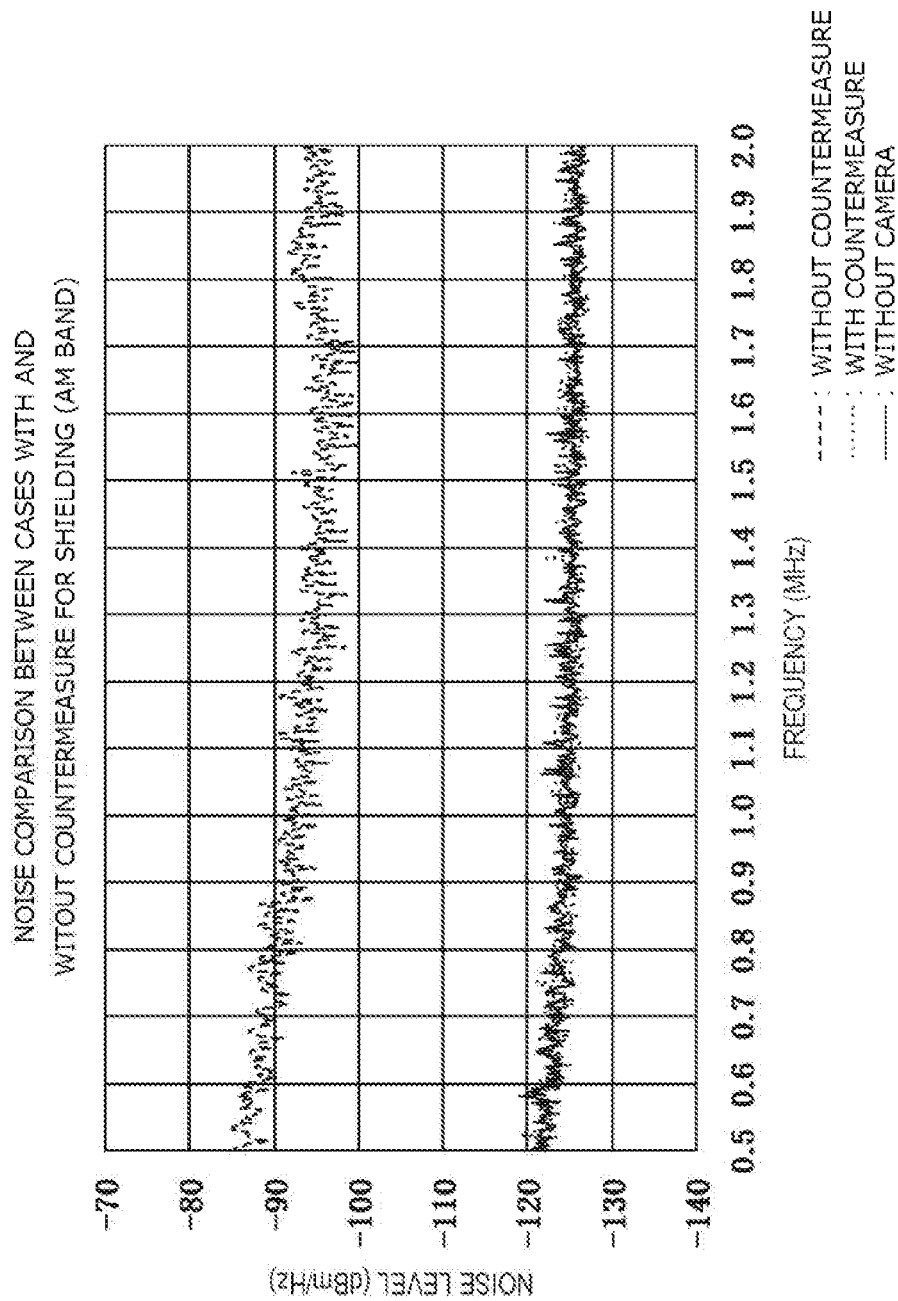
FIG. 22 shows noise spectra for comparison between AM band noise levels (dBm/Hz) that occur with and without a countermeasure for shielding.

FIG. 22 shows noise spectra in an AM band (a frequency band 0.5 to 1.7 MHz of AM radio broadcast) and compares noise levels (dBm/Hz) that occur with and without the countermeasure for shielding. Whereas without any countermeasure for shielding the noise level is around −90 dBm/Hz, with the countermeasure for shielding (but no noise filter) the noise level is suppressed to −120 dBm/Hz or lower (approximately the same level as in the case without the camera module).

Figure 23:
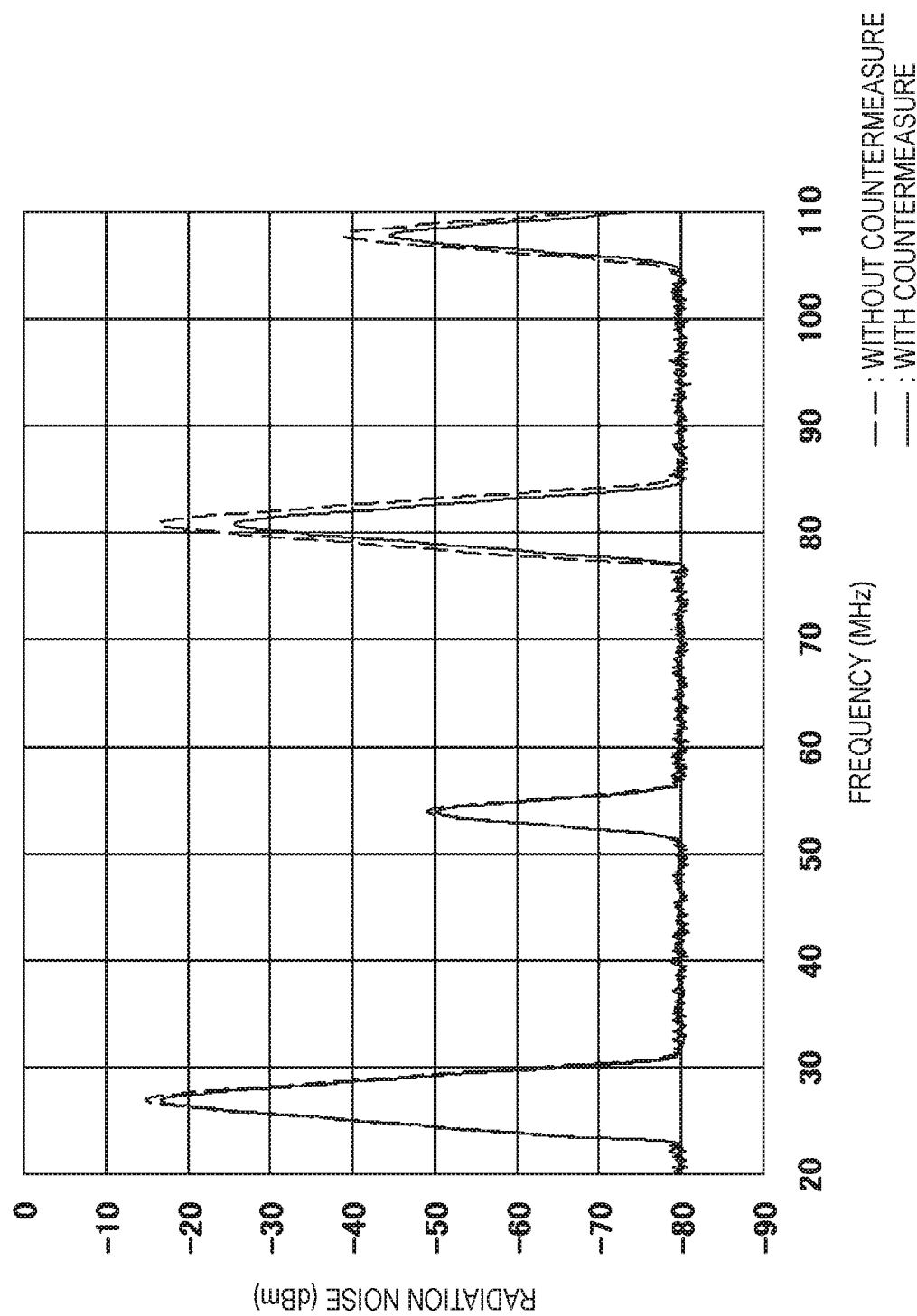
FIG. 23 shows noise spectra for comparison between noise (dBm) radiated from an oscillator when the noise filter is used and that when the noise filter is not used.

FIG. 23 shows noise spectra of radiation noise (dBm) of the oscillator with and without the noise filter. According to the first embodiment, since the noise filter 130 is disposed on the output side of the oscillator 114, harmonic waves, particularly a third harmonic wave, included in an output of the oscillator 114 can be suppressed and reception trouble in an FM band can thereby be eliminated.

Figure 24:
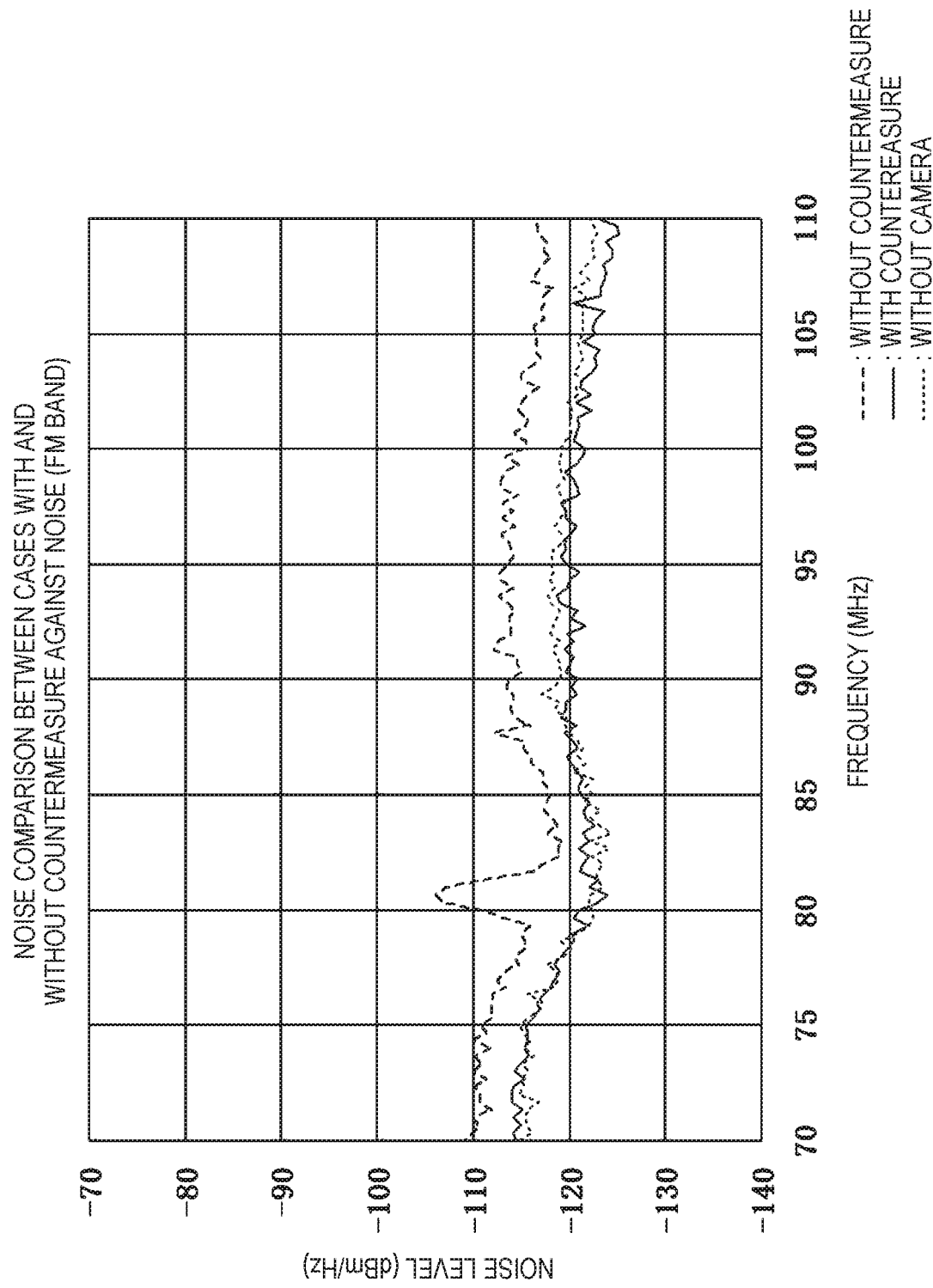
FIG. 24 shows noise spectra for comparison between FM band noise levels (dBm/Hz) with and without a countermeasure against noise.

FIG. 24 shows noise spectra for comparison between FM band noise levels (dBm/Hz) with and without the countermeasure against noise (noise filter) taken in addition to the countermeasure for shielding. It is seen that the noise level in an FM band is suppressed to approximately the same level as in the case without the camera module.

According to the first embodiment, noise is suppressed in both of an AM band and an FM band and trouble can be prevented in the reception of AM and FM radio broadcast and TV broadcast.

This embodiment can provide the following advantages:

(1) Since the camera module case 40 which surrounds the camera module 10 as a shield conductor is grounded to the vehicle body roof R, the camera module 10 can be shielded and hence noise generated in the camera module 10 can be prevented from being radiated to outside the case as radiation noise.

(2) Since a shielded cable is used as the module cable 60 which is connected to the circuit board 50 of the camera module 10 and its shield sheath conductor 61 is grounded to the vehicle body roof R, radiation noise that is radiated from the module cable 60 can be reduced.

(3) Since the noise filter 130 is provided on the circuit board 50 which is located in the camera module 10, noise originating from the oscillator 114 which acts as a noise generation source can be suppressed.

(4) With the above configuration, a phenomenon can be prevented that the reception, with the antenna element in the antenna device, of AM and FM band broadcast, TV broadcast, etc. is adversely affected by electromagnetic noise radiated from the camera module 10 as an electronic device.

(5) Furthermore, since the case 40 as a shield conductor can be electrically connected to the metal baseplate 3 directly, the number of components for grounding the case 40 to the vehicle body roof R can be decreased.

Embodiment 2

Figure 2A:
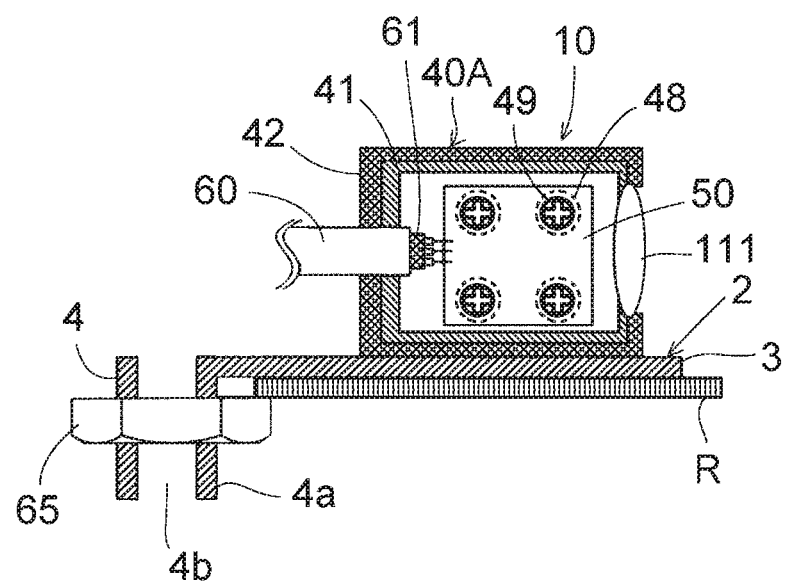
FIG. 2A is a schematic side sectional view showing the configuration of an essential part of a second embodiment of the present invention.
Figure 2B:
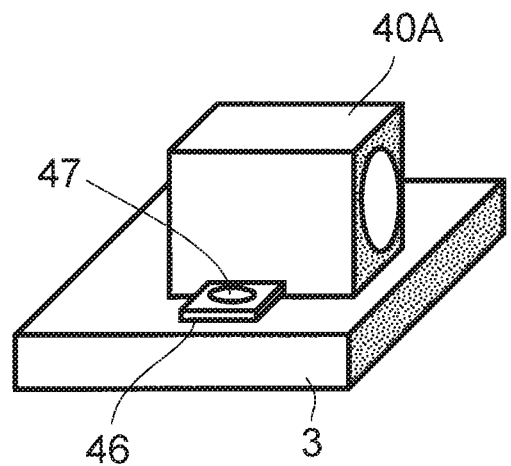
FIG. 2B is a perspective view showing a case that a case of a camera module is disposed on an antenna base in the second embodiment.

FIG. 2A shows the configuration of an essential part of the vehicular antenna device according to the second embodiment of the present invention, and shows a noise reduction shield structure of the antenna device 1 shown in FIGS. 5-10. In this case, a camera module case 40A of the camera module 10 is such that a shield conductor 42 is formed on the entire outer surfaces of an insulative body 41 (synthetic resin mold) by coating or plating of a conductive material or a like method. The camera module 10 is disposed on the metal baseplate 3. A circuit board 50 of the camera module 10 is fixed to bosses 48 which project inside the case 40A by board attachment screws 49. Since the case 40A of the camera module 10 is such that the shield conductor 42 is formed on the entire outer surfaces of the insulative body 41 by coating or plating of a conductive material or a like method, as shown in FIG. 2B the case 40A is fixed to and electrically connected to the antenna base 2 at the same time by screwing a conductive flange portion 46 which is integrated with the case 40A to the antenna base 2 by a conductive screw 47. The shield conductor 42 may be electrically connected to the baseplate 3 directly by soldering or the like instead of using the flange portion 46 or in addition to the screwing of the flange portion 46.

In the second embodiment, the shield conductor 42, formed as a case outer layer, of the camera module 10 is grounded to the vehicle body roof R via the baseplate 3, the attachment conductive member 4, and an attachment metal fitting 65. Since the shield conductor 42 formed as the case outer layer is electrically connected to the metal baseplate 3, the number of components for grounding the shield conductor 42 to the vehicle body roof R can be decreased. Furthermore, since the camera module case 40A of the camera module 10 is such that the shield conductor 42 is formed on the entire outer surfaces of the insulative body 41 by coating or plating of a conductive material or a like method, by using a synthetic resin insulative body 41 the case 40A can be made lighter than in a case that the entire case is made of a metal. The other part of the configuration and the other workings and advantages are the same as in the above-described first embodiment.

Embodiment 3

Figure 3A:
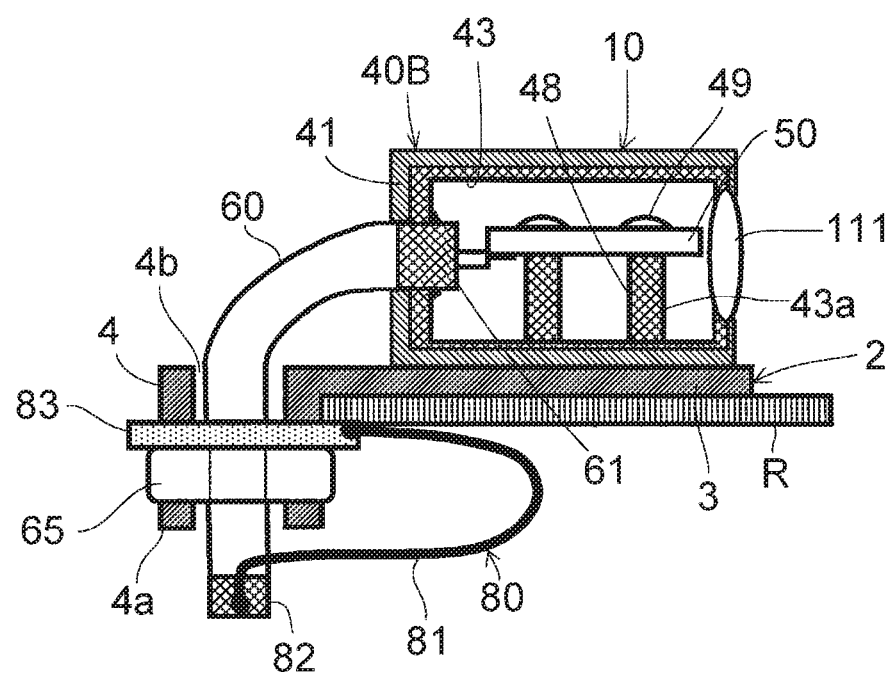
FIG. 3A is a schematic side sectional view showing the configuration of an essential part of a third embodiment of the present invention.
Figure 3B:
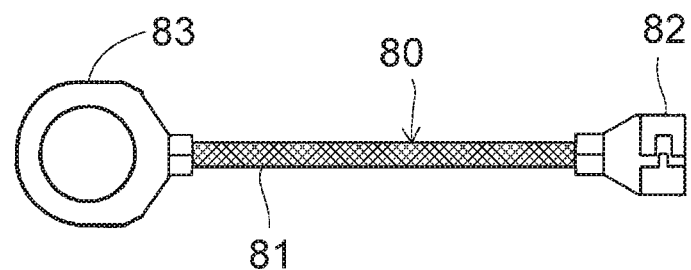
FIG. 3B is a plan view of a connecting member employed in the third embodiment.

FIG. 3A shows the configuration of an essential part of the vehicular antenna device according to the third embodiment of the present invention, and shows a noise reduction shield structure of the antenna device 1 shown in FIGS. 5-10. In this case, the camera module 10 is disposed on the metal baseplate 3 and a camera module case 40B of the camera module 10 is such that a shield conductor 43 is formed on the entire inner surfaces of an insulative body 41 excluding a lens portion by coating or plating of a conductive material or a like method. One end portion of the shield sheath conductor 61 of the module cable 60 connected to a circuit board 50 is electrically connected to the shield conductor 43 by soldering or the like and its other end portion is grounded to the vehicle body roof R via a connecting member 80 shown in FIG. 3B. More specifically, the connecting member 80 is a member in which a tubular terminal 82 and a washer-like terminal 83 are connected to the two respective ends of a wire 81 by crimping or soldering. The one terminal 82 is electrically connected to the outer circumferential surface of the shield sheath conductor 61 by crimping or soldering, and the other, washer-like terminal 83 is electrically connected to the attachment conductive member 4 and the vehicle body roof R by being fastened so as to come into close contact with the vehicle body roof R by an attachment metal fitting 65 which is fitted with the projection 4a of the attachment conductive member 4 and (threadedly) engaged with the projection 4a. As a result, the shield conductor 43 which is a case inside layer is grounded to the vehicle body roof R via the shield sheath conductor 61 of the module cable 60 and the connecting member 80.

Furthermore, where extension portions 43a of the shield conductor 43 are formed on the outer surfaces of bosses 48 which are provided inside the case 40B by coating or plating of a conductive material or a like method, a ground conductor pattern of the circuit board 50 can be electrically connected to the extension portions 43a of the shield conductor 43 when the circuit board 50 is fixed to the bosses 48 by conductive board attachment screws 49. Another structure is possible in which the ground conductor pattern of the circuit board 50 is not electrically connected to the shield conductor 43 directly.

Also in the third embodiment, since the camera module case 40B is such that the shield conductor 43 is formed on the entire inner surfaces of the insulative body 41 by coating or plating of a conductive material or a like method, the case 40B can be made lighter than in a case that the entire case is made of a metal. The other part of the configuration and the other workings and advantages are the same as in the above-described first embodiment.

Embodiment 4

Figure 4:
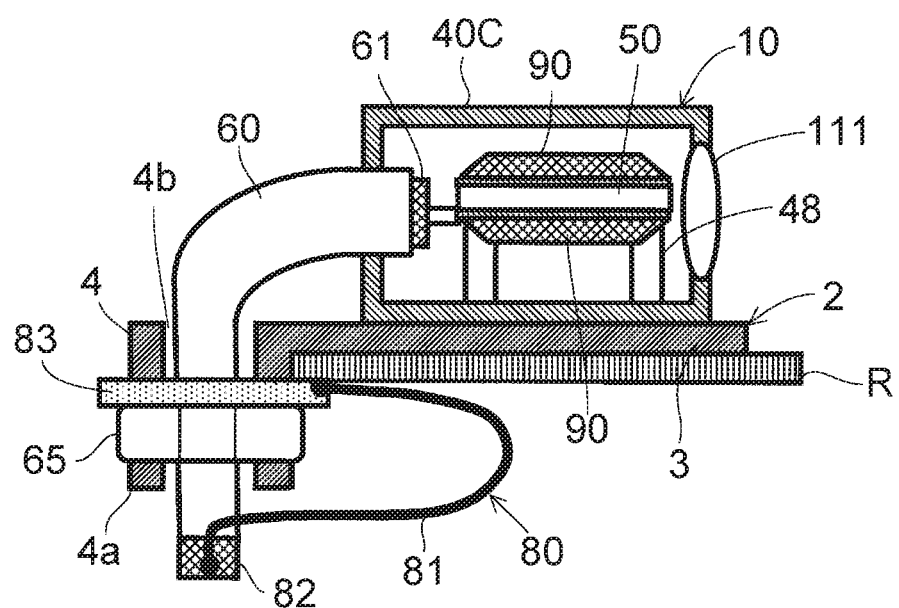
FIG. 4 is a schematic side sectional view showing the configuration of a fourth embodiment of the present invention.
Figure 5:
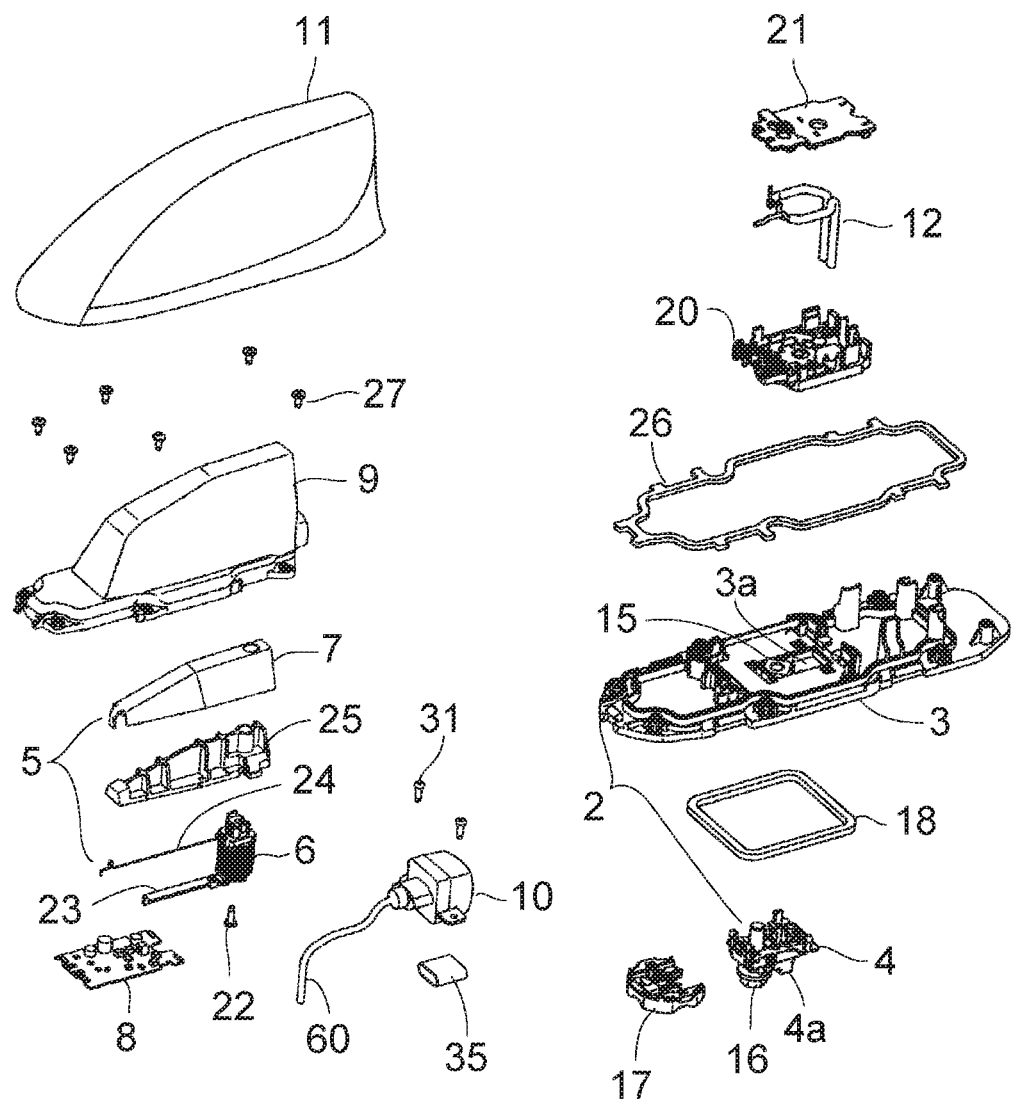
FIG. 5 is an exploded perspective view showing the overall configuration of a vehicular antenna device to which the first to fourth embodiments are applied.

FIG. 4 shows the configuration of an essential part of the vehicular antenna device according to the fourth embodiment of the present invention, and shows a noise reduction shield structure of the antenna device 1 shown in FIGS. 5-10. In this case, although the camera module 10 is disposed on the metal baseplate 3, a case 40C is an insulative body (synthetic resin mold) and hence does not serve as a shield conductor. Instead, shield conductors 90 are disposed adjacent to and fixed to a circuit board 50 in such a manner that both surfaces of the circuit board 50 which is fixed to bosses 48 provided inside the case 40C are covered with (sandwiched between) the shield conductors 90. One end portion of the shield sheath conductor 61 of the module cable 60 which is connected to the circuit board 50 is electrically connected to the shield conductors 90, and its other end portion is grounded to the vehicle body roof R in the same manner as in the third embodiment (see FIG. 3A). As a result, the shield conductors 90 which cover the top and bottom surfaces of the circuit board 50 are grounded to the vehicle body roof R via the shield sheath conductor 61 of the module cable 60 and the connecting member 80. In this manner, radiation noise is reduced by shielding around the circuit board 50. The other part of the configuration and the other workings and advantages are the same as in the above-described first embodiment.

It suffices that the shield conductors 90 be formed so as to be electrically connected to the ground conductor pattern of the circuit board 50 and/or the shield sheath conductor 61 directly inside the case.

A shield conductor 90 may be disposed so as to cover only one surface of the circuit board 50 as long as a necessary noise reduction effect is obtained.

Whereas the vehicular antenna device 1 shown in FIGS. 5-10 employs the metal baseplate 3, in recent years increase of the fuel efficiency of vehicles has become an important issue and antenna devices as vehicular components have been required to be reduced in weight in grams. As a result, components of antenna devices have increasingly come to be made of a resin: the antenna base, which was made of a metal previously, has come to be designed so as to be made of a resin partially. A weight-reduced antenna base whose portion to be attached to a vehicle is made of a metal and remaining peripheral portion (i.e., baseplate) is made of a resin. Where the baseplate of the antenna base is made of a resin, the camera module case cannot come into direct contact with a metal: the camera module case needs to be grounded via a small metal portion (i.e., attachment conductive member 4) remaining as the portion to be attached to the vehicle. The following fifth to ninth embodiments will be directed to shield structures for that purpose.

Embodiment 5

Figure 11A:
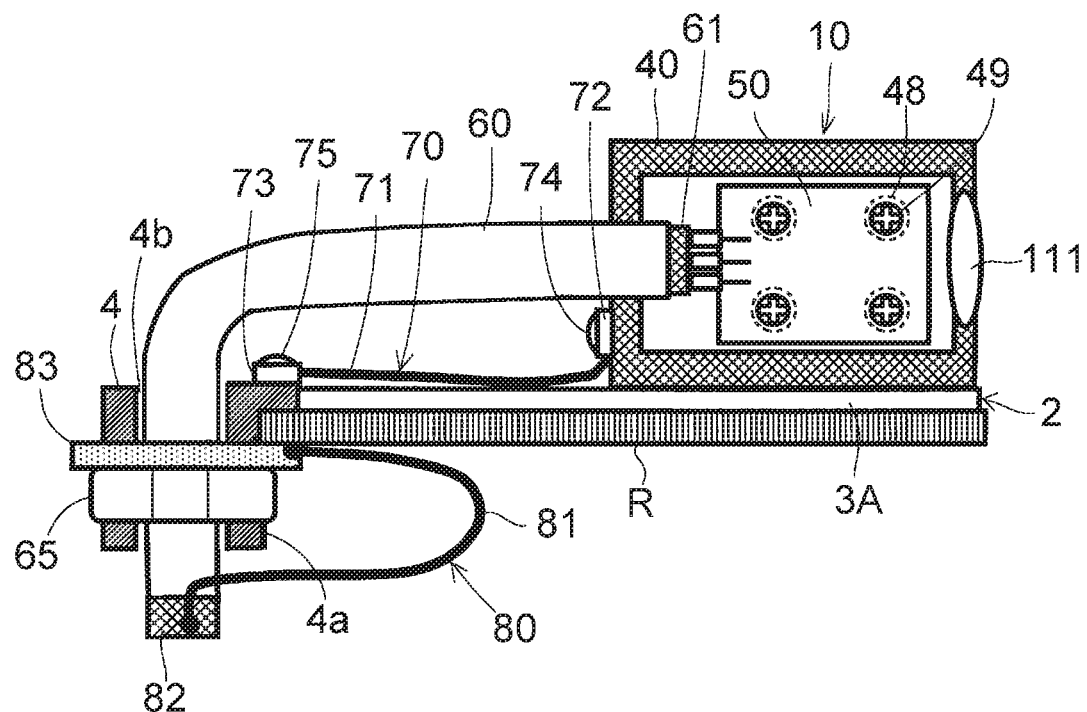
FIG. 11A is a schematic side sectional view of showing the configuration of an essential part of a fifth embodiment of the present invention.

FIG. 11A shows the configuration of an essential part of a vehicular antenna device according to the fifth embodiment of the present invention, and shows a noise reduction shield structure. In this case, a camera module case 40 of the camera module 10 is a metal member (e.g., aluminum diecast member) that also serves as a shield conductor. The lens 111 is attached to the rear wall of the camera module case 40, and a circuit board 50 is fixed to bosses (projections) 48 which project inside the case 40 by metal board attachment screws 49.

Figure 11B:
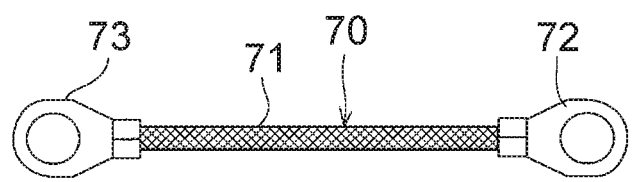
FIG. 11B is a plan view of a connecting member employed in the fifth embodiment.

The antenna base 2 has a baseplate 3A which is an insulative member (synthetic resin mold) and the attachment conductive member 4 which is located at a central position of the baseplate 3A, and the case 40 of the camera module 10 is disposed on the baseplate 3A of the antenna base 2. Thus, the metal case 40 is electrically connected to the attachment conductive member 4 using a connecting member 70 shown in FIG. 11B. More specifically, the connecting member 70 is a member in which terminals 72 and 73 are connected to the two respective ends of a wire 71 by crimping or soldering. The one terminal 72 is fixed to the case 40 by a conductive screw 74, and the other terminal 73 is fixed to the attachment conductive member 4 by a conductive screw 75. The attachment conductive member 4 is to be fixed to the vehicle body roof R by (threadedly) engaging, from the vehicle compartment side, an attachment metal fitting (nut or washer) 65 to the projection 4a which penetrates through the attachment hole of the vehicle body roof R.

A ground conductor pattern of the circuit board 50 may be electrically connected to the bosses 48 (and hence the case 40 which is a shield conductor) when the circuit board 50 is fixed to the bosses 48 by conductive board attachment screws 49. Another structure is possible in which the ground conductor pattern of the circuit board 50 is not electrically connected to the case 40 directly.

The module cable 60 penetrates through the case 40 and leads out to the side of the bottom surface of the antenna base 2 (the outside of the antenna device) through the hole which is formed inside the projection 4a of the attachment conductive member 4. The module cable 60 is a shielded cable and has a shield sheath conductor 61 which surrounds the signal line, the power line, etc. The shield sheath conductor 61 is grounded to the vehicle body roof R via the connecting member 80 shown in FIG. 3B. More specifically, the one terminal 82 of the connecting member 80 is electrically connected to the shield sheath conductor 61 by crimping or soldering, and its other, washer-like terminal 83 is electrically connected to the attachment conductive member 4 and the vehicle body roof R by being fastened so as to come into close contact with the vehicle body roof R by an attachment metal fitting 65 which is fitted with the projection 4a of the attachment conductive member 4 and (threadedly) engaged with the projection 4a. The module cable 60 has, inside the shield sheath conductor 61, a ground line (not shown in any drawings) which is connected to the ground conductor pattern (ground pattern) of the circuit board 50. As a general rule, an end portion, located inside the case, of the shield sheath conductor 61 is connected to the ground conductor pattern (ground pattern) of the circuit board 50; however, it is not always the case that the end portion of the shield sheath conductor 61 is connected to a portion formed on the circuit board 50 (this case is not shown in any drawings). The shield sheath conductor 61 may either be electrically connected to the case 40 directly or be electrically connected to the attachment conductive member 4 via a separate connecting member (either case is not shown in any drawings).

With the above configuration, even in the case where the baseplate 3A made of an insulative material is employed, both of the case 40 and the shield sheath conductor 61 of the module cable 60 are grounded to the vehicle body roof R, whereby radiation noise that is radiated to the outside from the case 40 of the camera module 10 and the module cable 60 is suppressed. Furthermore, weight and cost reduction can be attained by using a synthetic resin mold as the baseplate 3A made of an insulative material. The other part of the configuration and the other workings and advantages are the same as in the above-described first embodiment.

Embodiment 6

Figure 12:
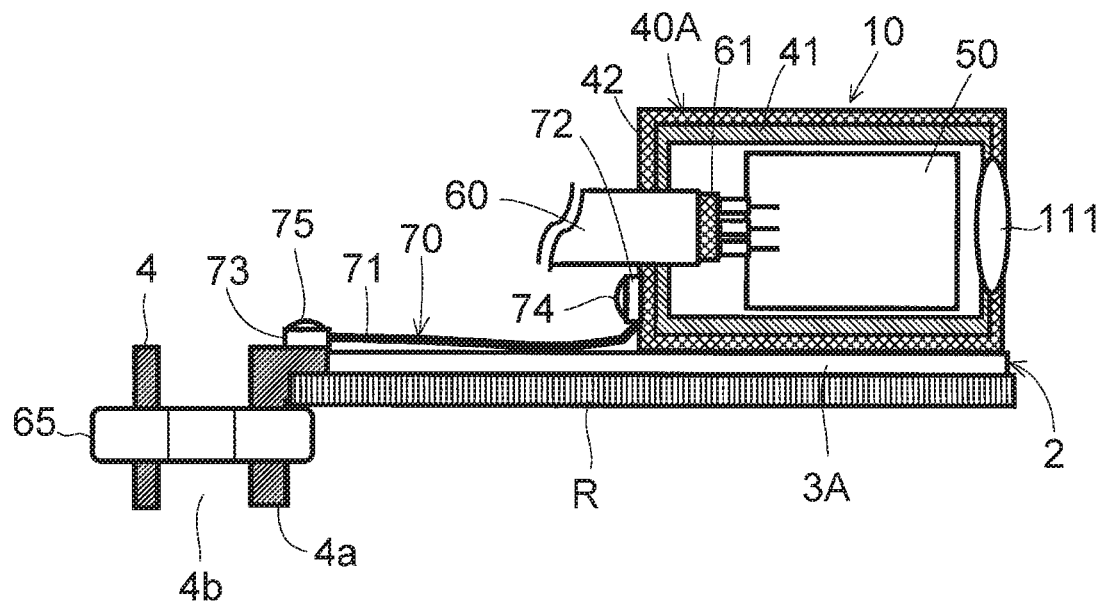
FIG. 12 is a schematic side sectional view of showing the configuration of an essential part of a sixth embodiment of the present invention.

FIG. 12 shows the configuration of an essential part of a vehicular antenna device according to the sixth embodiment of the present invention, and shows a noise reduction shield structure. In this case, a camera module case 40A of the camera module 10 is disposed on a baseplate 3A, made of an insulative material, of the antenna base 2. The case 40A is such that a shield conductor 42 is formed on the entire outer surfaces of an insulative body 41 by coating or plating of a conductive material or a like method. The, the shield conductor 42 which is formed as a case outer layer is electrically connected to the attachment conductive member 4 using the connecting member 70 shown in FIG. 11B. Although not shown in any drawings, the shield sheath conductor 61 of the module cable 60 is grounded to the vehicle body roof R as in the fifth embodiment (see FIG. 11A).

In the sixth embodiment, since the camera module case 40A is such that the shield conductor 42 is formed on the entire outer surfaces of the insulative body 41 by coating or plating of a conductive material or a like method, by using a synthetic resin insulative body 41 the case 40A can be made lighter than in a case that the entire case is made of a metal. The other part of the configuration and the other workings and advantages are the same as in the above-described first embodiment.

Embodiment 7

Figure 13:
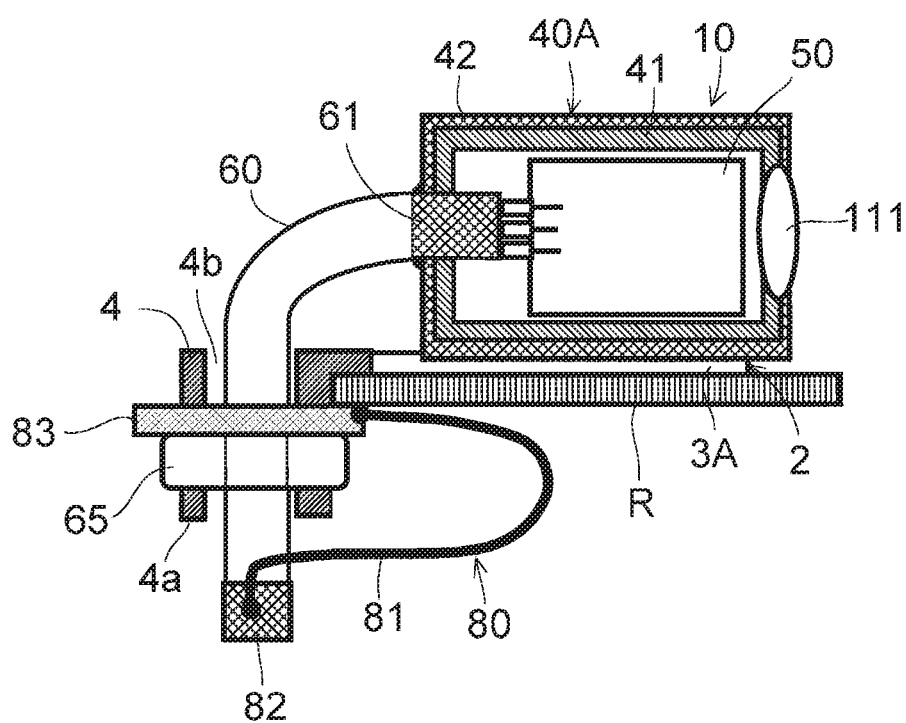
FIG. 13 is a schematic side sectional view of showing the configuration of an essential part of a seventh embodiment of the present invention.

FIG. 13 shows the configuration of an essential part of a vehicular antenna device according to the seventh embodiment of the present invention, and shows a noise reduction shield structure. In this case, a camera module case 40A of the camera module 10 is disposed on a baseplate 3A, made of an insulative material, of the antenna base 2. The case 40A is such that a shield conductor 42 is formed on the entire outer surfaces of an insulative body 41 by coating or plating of a conductive material or a like method. One end portion of the shield sheath conductor 61 of the module cable 60 connected to a circuit board 50 is electrically connected to the shield conductor 42 by soldering or the like and its other end portion is grounded to the vehicle body roof R via the connecting member 80 shown in FIG. 3B as in the fifth embodiment (see FIG. 11A). As a result, the shield conductor 42 which is a case outside layer is grounded to the vehicle body roof R via the shield sheath conductor 61 of the module cable 60 and the connecting member 80.

Also in the seventh embodiment, since the camera module case 40A is such that the shield conductor 42 is formed on the entire outer surfaces of the insulative body 41 by coating or plating of a conductive material or a like method, by using a synthetic resin insulative body 41 the case 40A can be made lighter than in a case that the entire case is made of a metal. The other part of the configuration and the other workings and advantages are the same as in the above-described first embodiment.

Embodiment 8

Figure 14:
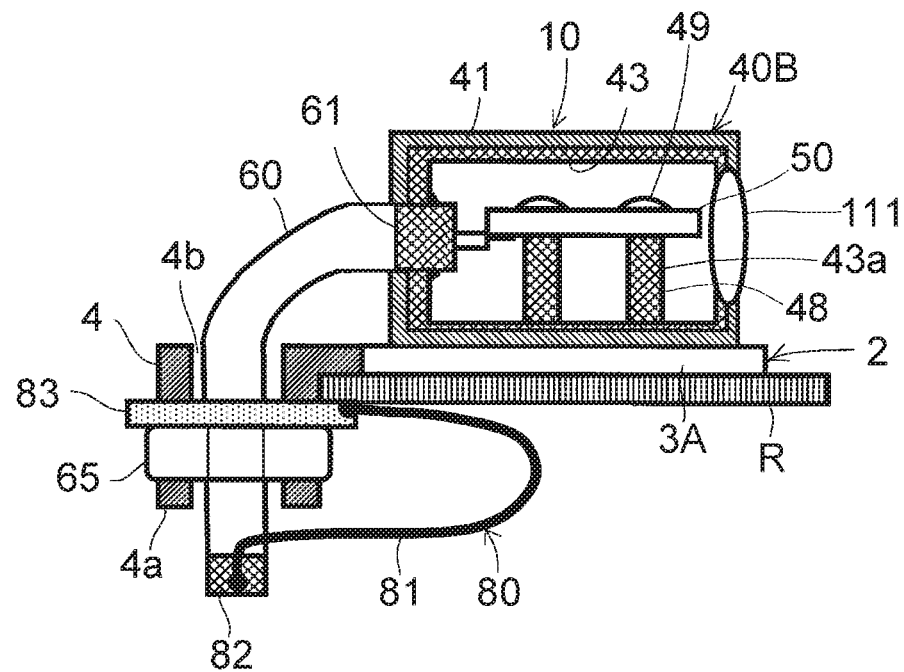
FIG. 14 is a schematic side sectional view of showing the configuration of an essential part of an eighth embodiment of the present invention.

FIG. 14 shows the configuration of an essential part of the vehicular antenna device according to the eighth embodiment of the present invention, and shows a noise reduction shield structure. In this case, a camera module case 40B of the camera module 10 is disposed on a baseplate 3A, made of an insulative material, of the antenna base 2. The case 40B is such that a shield conductor 43 is formed on the entire inner surfaces of an insulative body 41 excluding a lens portion by coating or plating of a conductive material or a like method. One end portion of the shield sheath conductor 61 of the module cable 60 connected to a circuit board 50 is electrically connected to the shield conductor 43 by soldering or the like and its other end portion is grounded to the vehicle body roof R via the connecting member 80 shown in FIG. 3B as in the fifth embodiment (see FIG. 11A). As a result, the shield conductor 43 which is a case inside layer is grounded to the vehicle body roof R via the shield sheath conductor 61 of the module cable 60 and the connecting member 80.

Furthermore, where extension portions 43a of the shield conductor 43 are formed on the outer surfaces of bosses 48 which are provided inside the case 40B by coating or plating of a conductive material or a like method, a ground conductor pattern of the circuit board 50 can be electrically connected to the extension portions 43a of the shield conductor 43 when the circuit board 50 is fixed to the bosses 48 by conductive board attachment screws 49. Another structure is possible in which the ground conductor pattern of the circuit board 50 is not electrically connected to the shield conductor 43 directly.

Also in the eighth embodiment, since the camera module case 40B is such that the shield conductor 43 is formed on the entire inner surfaces of the insulative body 41 by coating or plating of a conductive material or a like method, by using a synthetic resin insulative body 41 the case 40B can be made lighter than in a case that the entire case is made of a metal. The other part of the configuration and the other workings and advantages are the same as in the above-described first embodiment.

Embodiment 9

Figure 15:
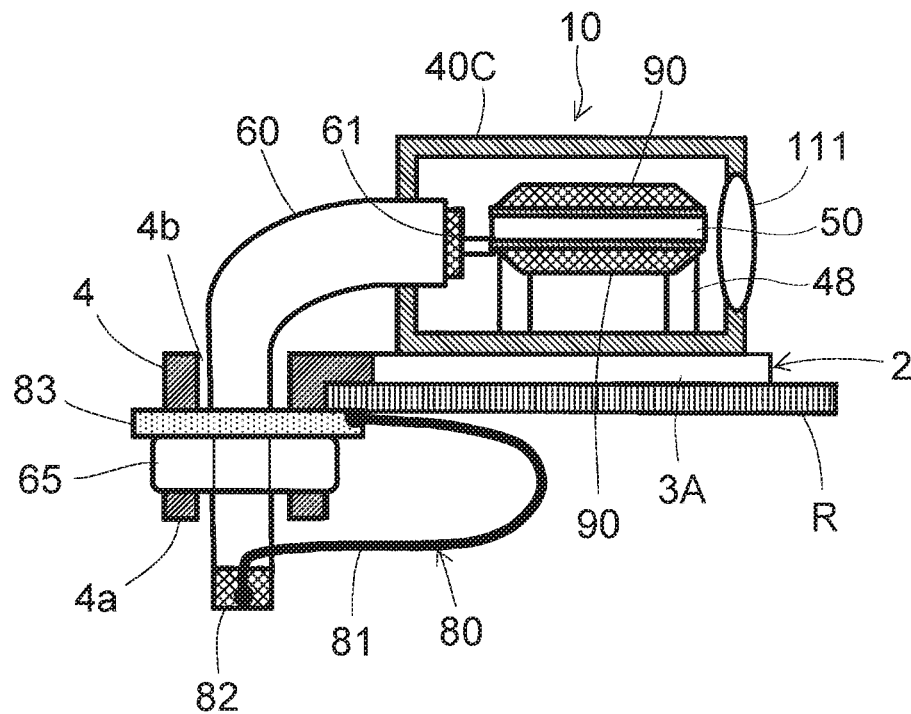
FIG. 15 is a schematic side sectional view of showing the configuration of an essential part of a ninth embodiment of the present invention.

FIG. 15 shows the configuration of an essential part of the vehicular antenna device according to the ninth embodiment of the present invention, and shows a noise reduction shield structure. In this case, a camera module case 40C of the camera module 10 is disposed on a baseplate 3A, made of an insulative material, of the antenna base 2. In this case, the case 40C is an insulative body (synthetic resin mold) and hence does not serve as a shield conductor. Instead, shield conductors 90 are disposed adjacent to and fixed to a circuit board 50 in such a manner that both surfaces of the circuit board 50 which is fixed to bosses 48 provided inside the case 40C are covered with (sandwiched between) the shield conductors 90. One end portion of the shield sheath conductor 61 of the module cable 60 which is connected to the circuit board 50 is electrically connected to the shield conductors 90, and its other end portion is grounded to the vehicle body roof R in the same manner as in the fifth embodiment (see FIG. 11A). As a result, the shield conductors 90 which cover the top and bottom surfaces of the circuit board 5 are grounded to the vehicle body roof R via the shield sheath conductor 61 of the module cable 60 and the connecting member 80. The other part of the configuration and the other workings and advantages are the same as in the above-described first embodiment.

It suffices that the shield conductors 90 be formed so as to be electrically connected to the ground conductor pattern of the circuit board 50 and/or the shield sheath conductor 61 directly inside the case.

Embodiment 10

Figure 16:
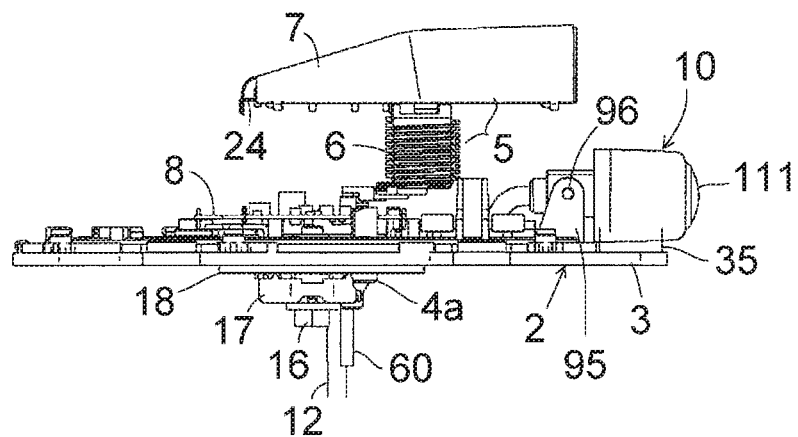
FIG. 16 is a side view of a vehicular antenna device according to a 10th embodiment of the present invention in which the angle of a camera module is adjustable with respect to an antenna base (an inner case and an outer case are omitted).

FIG. 16 shows a 10th embodiment of the present invention. In this case, the camera module 10 of a vehicular antenna device is attached so that it is pivotally supported using a pin 96 by a bracket 95 which is fixed to (or integrated with) a metal baseplate 3 of the antenna base 2 and its inclination angle (e.g., elevation angle) with respect to the antenna base 2 is thereby made adjustable. The corresponding structure employed in any of the above-described first to fourth embodiments etc. can be applied to the shield structure of the camera module 10 itself excluding the structure for attachment of the camera module 10 to the baseplate 3. By making the bracket 95 conductive, the case 40 or the case 40A (whose outer surface is conductive) can be grounded to the vehicle body roof R along a route including the conductive bracket 95, the baseplate 3, and the attachment conductive member 4 which is attached (electrically connected) to the baseplate 3.

Figure 19A:
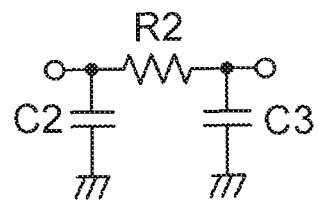
FIG. 19A is a circuit diagram of another example noise filter (lowpass filter) employed in the above circuit configuration of the camera module.
Figure 19B:
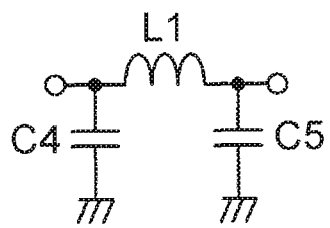
FIG. 19B is a circuit diagram of another example noise filter (lowpass filter) employed in the above circuit configuration of the camera module.
Figure 19C:
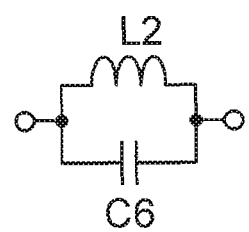
FIG. 19C is a circuit diagram of still another example noise filter (band-emission filter) employed in the above circuit configuration of the camera module.
Figure 19D:
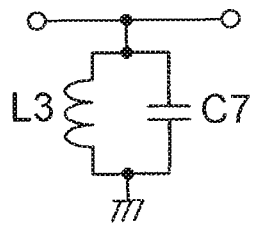
FIG. 19D is a circuit diagram of yet another example noise filter (band-emission filter) employed in the above circuit configuration of the camera module.
Figure 19E:
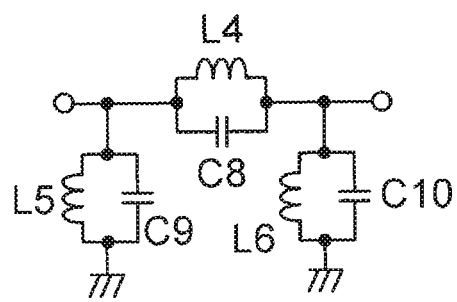
FIG. 19E is a circuit diagram of a further example noise filter (bandpass filter) employed in the above circuit configuration of the camera module.
Figure 20:
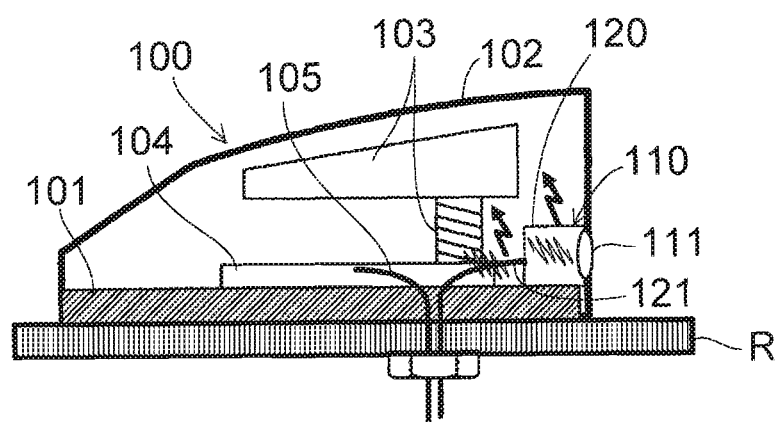
FIG. 20 is a schematic side view of a vehicular antenna device and illustrates paths along which an antenna element receives noise from a camera module as an electronic device.
Figure 21:
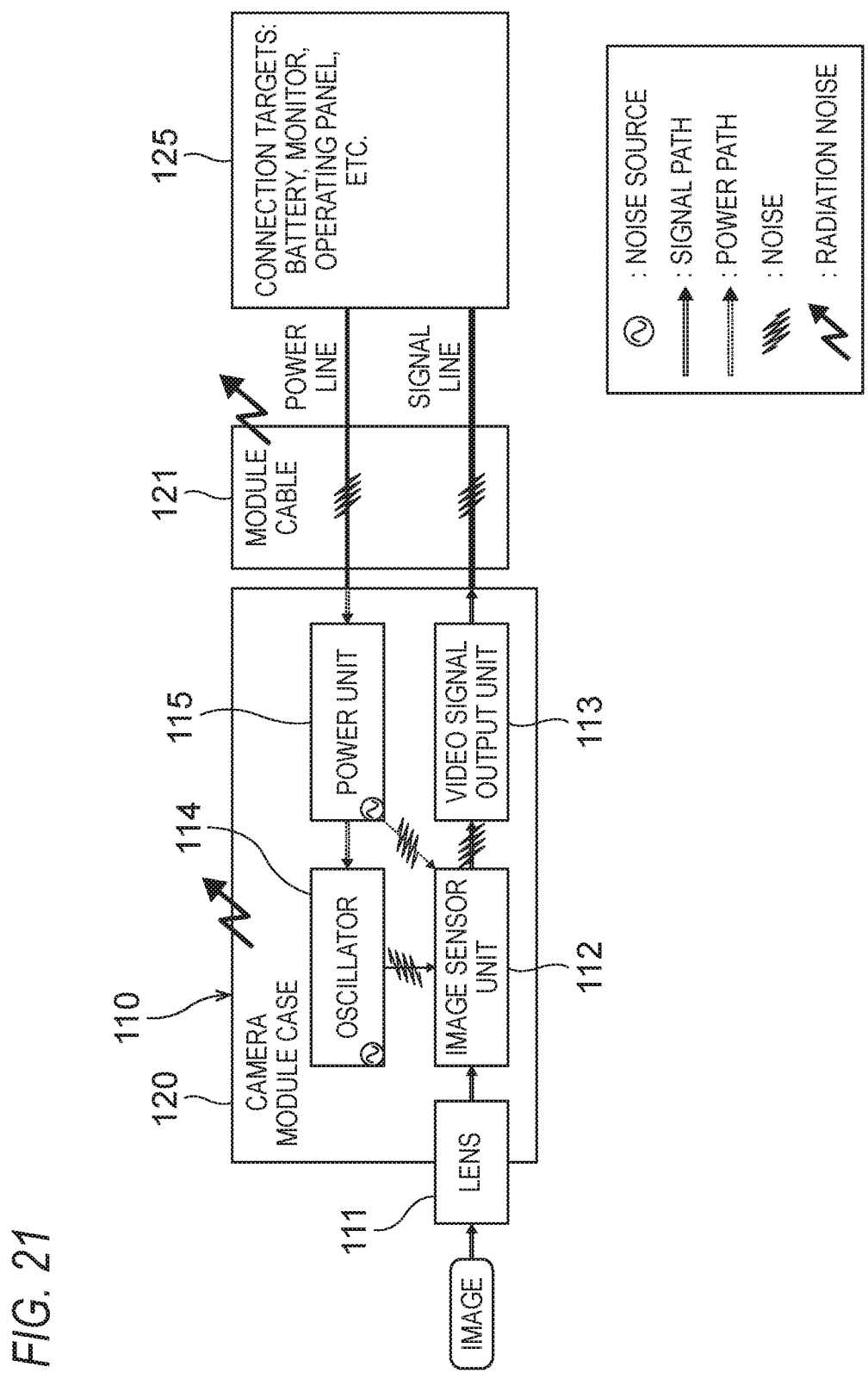
FIG. 21 is a block diagram showing the configuration of the above camera module and illustrates noise radiation paths.

The noise filter 130 which is mounted on the circuit board 50 of the camera module 10 is not limited to the circuit shown in FIG. 18. For example, the noise filter 130 may be any of a lowpass filter shown in FIG. 19A which consists of a resistor R2 and capacitors C2 and C3, a lowpass filter shown in FIG. 19B which consists of a coil L1 and capacitors C4 and C5, a band emission filter shown in FIG. 19C which consists of a coil L2 and a capacitor C6, a band emission filter shown in FIG. 19D which consists of a coil L3 and a capacitor C7, and a bandpass filter shown in FIG. 19E which consists of coils L4, L5, and L6 and capacitors C8, C9, and C10. In each of these filters, the configuration or the constants may be changed according to the oscillation frequency of the oscillator 114 or the reception band of the antenna device.

Although the present invention has been described above using the embodiments as examples, it would be understood by those skilled in the art that each constituent element and each step of the process of each embodiment can be modified in various manners within the scope of the claims. Modifications will be described below.

Although in the second and third embodiments etc. the shield conductor is provided as one of an outer layer and an inner layer the camera module case, it may be provided as both of an outer layer and an inner layer.

Although the vehicular antenna device having a shark-fm-shaped appearance shown in FIGS. 5-10 was described as an example vehicular antenna device according to the present invention, the vehicular antenna device may have a desired external shape. Furthermore, the location where the vehicular antenna device is attached is not limited to the vehicle body roof.

Although the camera module has been used as an example electronic device incorporated in the vehicular antenna device, the present invention is not limited this case and can be applied to, for example, a case that the vehicular antenna device incorporates any of various kinds of devices that generate electromagnetic noise such as a human sensor.

DESCRIPTION OF SYMBOLS

1: Vehicular antenna device; 2: Antenna base; 3, 3A: baseplate; 4: Attachment conductive member (pre-locking member); 5: Antenna element; 6: Coil; 7: Top element; 8: Antenna amplifier board; 9: Inner case; 10: Camera module; 11: Outer case; 11a: Window; 12: Antenna cable; 15: Attachment nut; 16: Bolt; 17: Washer having nails; 18: Antenna attachment pad; 23, 24: Connecting conductor; 35: Vibration-absorbing gasket; 40, 40A, 40B, 40C: Camera module case; 41: Insulative body; 42, 43, 90: Shield conductor; 50: Circuit board; 60: Module cable; 61: Shield sheath conductor; 70, 80: Connecting member; 95: Bracket; 111: Lens; 112: Image sensor unit; 113: Video signal output unit; 114: Oscillator; 115: Power unit; 130: Noise filter; C1-C10: Capacitor; L1-L6: Coil; R1, R2: Resistor; R: Vehicle body roof.

The invention claimed is:

1. A vehicular antenna device comprising:
an antenna base to be fixed to a vehicle body through an attaching member;
an antenna case which covers the antenna base; and
an antenna element and a camera module which are disposed in an internal space surrounded by the antenna base and the antenna case,
wherein the camera module has a case that surrounds at least a part of a noise generation source in the camera module,
wherein the case is a shield conductor or is such that the shield conductor is provided on at least one of an inside and an outside of an insulative body,
wherein the antenna base includes an attachment conductive member and a conductor baseplate,
wherein the case is disposed on the conductor baseplate,
wherein the shield conductor that is the case or is included in the case is electrically connected to the conductor baseplate and is grounded to the vehicle body.

2. The vehicular antenna device according to claim 1, further comprising another shield conductor that covers one surface or both surfaces of a circuit board of the camera module.

3. The vehicular antenna device according to claim 1, wherein the conductor baseplate and the case are integrally formed of a conductive body.

4. The vehicular antenna device according to claim 1, wherein a shielded cable is connected to the camera module, and
wherein a shield sheath conductor of the shielded cable is grounded to the vehicle body.

5. The vehicular antenna device according to claim 4, wherein the shield conductor is grounded to the vehicle body via the shield sheath conductor.

6. The vehicular antenna device according to claim 4, wherein one end portion of a connecting member is connected to the shield sheath conductor, and
wherein the other end portion of the connecting member is held by the attaching member and grounded to the vehicle body.

7. The vehicular antenna device according to claim 1, wherein the camera module includes a noise filter that reduce a noise generated by the noise generation source.

8. The vehicular antenna device according to claim 7, wherein the noise filter eliminates noise in a reception band of a signal that is received via the antenna element.

9. The vehicular antenna device according to claim 1, wherein a window that corresponds to a lens of the camera module is formed in the antenna case.

10. The vehicular antenna device according to claim 9, wherein the camera module is attached in such a manner that an inclination angle of the camera module is adjustable with respect to the antenna base.

11. A vehicular antenna device comprising:
an antenna base to be fixed to a vehicle body through an attaching member;
an antenna case which covers the antenna base; and
an antenna element and a camera module which are disposed in an internal space surrounded by the antenna base and the antenna case,
wherein the camera module has a case that surrounds at least a part of a noise generation source,
wherein the case is a shield conductor or is such that the shield conductor is provided on at least one of an inside and an outside of an insulative body,
wherein the antenna base includes an attachment conductive member and an insulative baseplate,
wherein the case is disposed on the insulative baseplate, and
wherein the shield conductor that is the case or is included in the case is electrically connected to the attachment conductive member via a first connecting member and is grounded to the vehicle body.

12. The vehicular antenna device according to claim 11, wherein a shield conductor covers one surface or both surfaces of a circuit board of the camera module.

13. The vehicular antenna device according to claim 11, wherein a shielded cable is connected to the camera module, and
wherein a shield sheath conductor of the shielded cable is grounded to the vehicle body.

14. The vehicular antenna device according to claim 13 wherein the shield conductor is grounded to the vehicle body via the shield sheath conductor.

15. The vehicular antenna device according to claim 13, wherein one end portion of a second connecting member is connected to the shield sheath conductor, and
wherein the other end portion of the second connecting member is held by the attaching member and grounded to the vehicle body.

16. The vehicular antenna device according to claim 11, wherein the camera module includes a noise filter that reduce a noise generated by the noise generation source.

17. The vehicular antenna device according to claim 16, wherein the noise filter eliminates noise in a reception band of a signal that is received via the antenna element.

18. The vehicular antenna device according to claim 11, wherein a window that corresponds to a lens of the camera module is formed in the antenna case.

19. The vehicular antenna device according to claim 18, wherein the camera module is attached in such a manner that an inclination angle of the camera module is adjustable with respect to the antenna base.

20. A roof mounted device for a vehicle comprising:
a base configured to couple with a roof of the vehicle;
an outer case operably coupled with the base;
an inner case proximate the outer case and defining an inner cavity;
a camera module disposed in communication with a through-hole formed in the outer case; and
a sealing member disposed between the camera module and the inner case and configured to apply a force to the camera module in a direction away from the inner case.

21. The roof mounted device according to claim 20, wherein the sealing member is provided at a rear wall of the inner case and defines a sealing plane, and
wherein the sealing member is configured to apply a force acting in a direction normal to the sealing plane.

22. The roof mounted device according to claim 21, further comprising a camera attachment portion configured to apply a force parallel to the sealing plane.

23. The roof mounted device according to claim 20, wherein a space is defined between the inner case and the outer case proximate the through-hole, and wherein at least a portion of the camera module is disposed in the space.

24. The roof mounted device according to claim 20, wherein the camera module is operably coupled to a data transmitting device adjacent to the base.

25. The vehicular antenna device according to claim 20, wherein the camera module is attached to a camera attachment hole formed in the inner case via the sealing member.

* * * * *